(12) United States Patent
Chheda et al.

(10) Patent No.: US 9,447,347 B2
(45) Date of Patent: Sep. 20, 2016

(54) BIOFUELS VIA HYDROGENOLYSIS-CONDENSATION

(75) Inventors: Juben Nemchand Chheda, Houston, TX (US); Kimberly Ann Johnson, Richmond, TX (US); Joseph Broun Powell, Houston, TX (US)

(73) Assignee: Shell Oil Company, Houston, TX (US)

(*) Notice: Subject to any disclaimer, the term of this patent is extended or adjusted under 35 U.S.C. 154(b) by 272 days.

(21) Appl. No.: 12/972,141

(22) Filed: Dec. 17, 2010

(65) Prior Publication Data

US 2011/0154721 A1 Jun. 30, 2011

Related U.S. Application Data

(60) Provisional application No. 61/291,567, filed on Dec. 31, 2009.

(51) Int. Cl.
| | |
|---|---|
| *C10L 1/00* | (2006.01) |
| *C10L 1/18* | (2006.01) |
| *C10L 1/182* | (2006.01) |
| *C10G 3/00* | (2006.01) |

(52) U.S. Cl.
CPC ............. *C10L 1/1826* (2013.01); *C10G 3/45* (2013.01); *C10G 3/46* (2013.01); *C10G 3/47* (2013.01); *C10G 3/49* (2013.01); *C10G 2300/1011* (2013.01); *C10G 2300/80* (2013.01); *C10G 2400/02* (2013.01); *C10G 2400/04* (2013.01); *C10G 2400/08* (2013.01); *Y02P 30/20* (2015.11)

(58) Field of Classification Search
CPC ............... C10G 2300/1011; C10G 2300/80; C10G 2400/04; C10G 2400/08; C10G 3/45; C10G 3/46; C10G 3/47; C10G 3/49; C10L 1/1826

USPC ............................ 44/307, 451, 445; 422/630
See application file for complete search history.

(56) References Cited

U.S. PATENT DOCUMENTS

| | | | | |
|---|---|---|---|---|
| 2,220,624 | A | * 11/1940 | Sherrard | ................. C07C 29/00 530/209 |
| 2,335,731 | A | * 11/1943 | Bottoms | ....................... 568/861 |
| 4,013,734 | A | 3/1977 | Kim | |
| 4,174,976 | A | 11/1979 | Bose | |
| 4,223,001 | A | 9/1980 | Novotny et al. | |
| 4,380,679 | A | 4/1983 | Arena | |
| 4,380,680 | A | 4/1983 | Arena | |

(Continued)

FOREIGN PATENT DOCUMENTS

| | | | | |
|---|---|---|---|---|
| BR | WO 2009155673 A1 | * 12/2009 | ................ C12P 7/10 |
| WO | WO03045841 | 6/2003 | ............... C01B 3/02 |

(Continued)

OTHER PUBLICATIONS

Davda, R.R., et al., "A Review of Catalystic Issues and Process Conditions for Renewable Hydrogen and Alkanes by Aqueous-Phase Reforming of Oxygenated Hydrocarbons Over Supported Metal Catalysts," Applied Catalysis, B:Environmental, p. 1-16 (2004).

(Continued)

*Primary Examiner* — Latosha Hines (57) ABSTRACT

A method comprises a providing a carbohydrate; reacting the carbohydrate directly with hydrogen in the presence of a hydrogenolysis catalyst to produce a reaction product comprising a polyol; and then processing at least a portion of the reaction product to form a fuel blend.

33 Claims, 3 Drawing Sheets

(56) References Cited

U.S. PATENT DOCUMENTS

| | | |
|---|---|---|
| 4,382,150 A | 5/1983 | Arena |
| 4,401,823 A | 8/1983 | Arena |
| 4,456,779 A | 6/1984 | Owen et al. |
| 4,487,980 A | 12/1984 | Arena |
| 4,503,274 A | 3/1985 | Arena |
| 4,541,836 A | 9/1985 | Derderian |
| 4,543,435 A | 9/1985 | Gould et al. |
| 4,554,260 A | 11/1985 | Pieters et al. |
| 4,670,613 A | 6/1987 | Ruyter et al. |
| 4,717,465 A | 1/1988 | Chen et al. |
| 4,828,812 A | 5/1989 | McCullen et al. |
| 4,885,421 A | 12/1989 | Harandi et al. |
| 4,919,896 A | 4/1990 | Harandi et al. |
| 4,935,568 A | 6/1990 | Harandi et al. |
| 5,001,292 A | 3/1991 | Harandi et al. |
| 5,019,135 A | 5/1991 | Sealock, Jr. et al. |
| 5,095,159 A | 3/1992 | Harandi et al. |
| 5,105,044 A | 4/1992 | Han et al. |
| 5,130,101 A | 7/1992 | Harandi et al. |
| 5,139,002 A | 8/1992 | Lynch et al. |
| 5,177,279 A | 1/1993 | Harandi |
| 5,180,868 A | 1/1993 | Baker et al. |
| 5,238,898 A | 8/1993 | Han et al. |
| 5,344,849 A | 9/1994 | Ayasse |
| 5,578,647 A | 11/1996 | Li et al. |
| 5,616,154 A | 4/1997 | Elliott et al. |
| 5,651,953 A | 7/1997 | Yokoyama et al. |
| 5,660,602 A | 8/1997 | Collier, Jr. et al. |
| 5,666,923 A | 9/1997 | Collier, Jr. et al. |
| 5,701,025 A | 12/1997 | Yoshimori |
| 5,787,863 A | 8/1998 | Henig et al. |
| 5,837,506 A | 11/1998 | Lynd et al. |
| 5,861,137 A | 1/1999 | Edlund |
| 5,879,463 A * | 3/1999 | Proenca ............ C13K 1/02 127/1 |
| 5,959,167 A | 9/1999 | Shabtai et al. |
| 6,022,419 A | 2/2000 | Torget et al. |
| 6,043,392 A | 3/2000 | Holtzapple et al. |
| 6,054,041 A | 4/2000 | Ellis et al. |
| 6,059,995 A | 5/2000 | Topsoe et al. |
| 6,090,595 A | 7/2000 | Foody et al. |
| 6,152,975 A | 11/2000 | Elliott et al. |
| 6,171,992 B1 | 1/2001 | Autenrieth et al. |
| 6,172,272 B1 | 1/2001 | Shabtai et al. |
| 6,207,132 B1 | 3/2001 | Lin et al. |
| 6,235,797 B1 | 5/2001 | Elliot et al. |
| 6,280,701 B1 | 8/2001 | Autenrieth et al. |
| 6,291,725 B1 | 9/2001 | Chopade et al. |
| 6,323,383 B1 | 11/2001 | Tsuchida et al. |
| 6,361,757 B1 | 3/2002 | Shikada et al. |
| 6,372,680 B1 | 4/2002 | Wu et al. |
| 6,387,554 B1 | 5/2002 | Verykios |
| 6,397,790 B1 | 6/2002 | Collier, Jr. |
| 6,413,449 B1 | 7/2002 | Wieland et al. |
| 6,440,895 B1 | 8/2002 | Tonkovich et al. |
| 6,479,428 B1 | 11/2002 | Tonkovich et al. |
| 6,479,713 B1 | 11/2002 | Werpy et al. |
| 6,486,366 B1 | 11/2002 | Ostgard et al. |
| 6,508,209 B1 | 1/2003 | Collier, Jr. |
| 6,570,043 B2 | 5/2003 | Elliott et al. |
| 6,607,707 B2 | 8/2003 | Reichman et al. |
| 6,670,300 B2 | 12/2003 | Werpy et al. |
| 6,677,385 B2 | 1/2004 | Werpy et al. |
| 6,699,457 B2 | 3/2004 | Cortright et al. |
| 6,739,125 B1 | 5/2004 | Mulligan |
| 6,749,828 B1 | 6/2004 | Fukunaga |
| 6,762,149 B2 | 7/2004 | Tonkovich et al. |
| 6,765,101 B1 | 7/2004 | Bhasin et al. |
| 6,841,085 B2 | 1/2005 | Werpy et al. |
| 6,953,873 B2 | 10/2005 | Cortright et al. |
| 6,964,757 B2 | 11/2005 | Cortright et al. |
| 6,964,758 B2 | 11/2005 | Cortright et al. |
| 6,969,506 B2 | 11/2005 | Tonkovich et al. |
| 7,022,824 B2 | 4/2006 | Vanoppen et al. |
| 7,038,094 B2 | 5/2006 | Werpy et al. |
| 7,186,668 B2 | 3/2007 | Werpy et al. |
| 7,199,250 B2 | 4/2007 | Werpy et al. |
| 7,273,957 B2 | 9/2007 | Bakshi et al. |
| 7,288,685 B2 | 10/2007 | Marker |
| 7,931,784 B2 | 4/2011 | Medoff |
| 2002/0020107 A1 | 2/2002 | Bailey et al. |
| 2002/0117167 A1 * | 8/2002 | Schmidt et al. ............ 127/36 |
| 2003/0099593 A1 | 5/2003 | Cortright et al. |
| 2003/0100807 A1 | 5/2003 | Shabtai et al. |
| 2003/0115792 A1 | 6/2003 | Shabtai et al. |
| 2003/0167679 A1 | 9/2003 | Jordan |
| 2005/0065337 A1 | 3/2005 | Werpy et al. |
| 2005/0203195 A1 | 9/2005 | Wang et al. |
| 2005/0207971 A1 | 9/2005 | Cortright et al. |
| 2005/0244329 A1 | 11/2005 | Casanave et al. |
| 2005/0271579 A1 | 12/2005 | Rogers |
| 2006/0013759 A1 | 1/2006 | Jiang et al. |
| 2007/0135301 A1 * | 6/2007 | Holcomb, Jr. ............ 502/244 |
| 2007/0142633 A1 | 6/2007 | Yao et al. |
| 2007/0173643 A1 | 7/2007 | Werpy et al. |
| 2007/0173651 A1 | 7/2007 | Holladay et al. |
| 2007/0173652 A1 | 7/2007 | Holladay et al. |
| 2008/0103339 A1 * | 5/2008 | Bloom ............ C07C 29/60 568/852 |
| 2008/0216391 A1 * | 9/2008 | Cortright ............ C10G 3/45 44/307 |
| 2008/0300434 A1 | 12/2008 | Cortright et al. |
| 2008/0300435 A1 * | 12/2008 | Cortright et al. ............ 585/14 |
| 2008/0302001 A1 | 12/2008 | Koivusalmi et al. |
| 2009/0113787 A1 | 5/2009 | Elliott et al. |
| 2009/0124839 A1 | 5/2009 | Dumesic et al. |
| 2009/0255171 A1 | 10/2009 | Dumesic et al. |
| 2010/0076233 A1 | 3/2010 | Cortright et al. |
| 2010/0170144 A1 * | 7/2010 | Day ............ C12P 7/6418 44/388 |
| 2010/0218417 A1 | 9/2010 | Bauldreay et al. |

FOREIGN PATENT DOCUMENTS

| | | | |
|---|---|---|---|
| WO | WO2006119357 | 11/2006 | ............ C07C 7/148 |
| WO | WO2007075370 | 7/2007 | ............ C08B 37/00 |
| WO | WO2007075476 | 7/2007 | |
| WO | WO2008109877 | 9/2008 | ............ C10G 3/00 |
| WO | WO 2008152200 A1 * | 12/2008 | |

OTHER PUBLICATIONS

Davda, R.R., et al., "Catalytic Reforming of Oxygenated Hydrocarbons for Hydrogen with Low Levels of Carbon Monoxide," Angewandte Chemie International 42: 4068-4071 (2003).

Huber, G.W., et al., "Production of Liquid Alkanes by Aqueous-Phase Processing of Biomass-Derived Carbohydrates," Science 308: 1446-1450 (2005).

Huber, G.W., et al., "Renewable Alkanes by Aqueous-Phase Reforming of Biomass-Derived Oxygenates," Angewandte Chemie International 43: 1549-1551 (2004).

Shabaker, J.W., et al., "Aqueous-Phase Reforming of Ethylene Glycol Over Supported Platinum Catalysts," Catalysis Letters 88:1-8 (2003).

Shabaker, J.W., et al., "Sn-modified Ni Catalysts for Aqueous-Phase Reforming: Characterization and Deactivation Studies," Journal of Catalysis 231:67-76 (2005).

Badger, P.C., "Ethanol From Cellulose: A General Review," Ethanol From Cellulose: A General Review p. 17-21 (2002).

Bardin, B.B., et al., "Acidity of Keggin-Type Heteropolycompounds Evaluated by Catalytic Probe Reactions, Sorption Microcalorimetry, and Density Functional Quantum Chemical Calculations," J. Phys. Chem. B 102-10817-10825 (1998).

Barrett, C.J., et al., "Single-Reactor Process for Sequential Aldol-Condensation and Hydrogenation of Biomass-Derived Compounds in Water," Applied Catalysis B: Environmental 66:111-118 (2006).

Brown, N.F., et al., "Carbon-Halogen Bond Scission and Rearrangement of Beta-Halohydrins on the Rh(111) Surface," J. Phys. Chem. 98:12737-12745 (1994).

(56) References Cited

OTHER PUBLICATIONS

Chen, N.Y., et al., "Liquid Fuel From Carbohydrates," Chemtech Aug. 1986 p. 506-509.
Chiu, C.W., et al., "Distribution of Methanol and Catalysts Between Biodiesel and Glycerin Phases," AIChE Journal 51:1274-1278 (2005).
Corma, A., et al., "Processing Biomass-Derived Oxygenates in the Oil Refinery: Catalytic Cracking (FCC) Reaction Pathways and Role of Catalyst," J. of Catalysis 247:307-327 (2007).
Cortright, R.D., et al., "Hydrogen From Catalytic Reforming of Biomass-Derived Hydrocarbons in Liquid Water," Nature 418:964-967 (2002).
Dasari, M.A., et al., "Low-Pressure Hydrogenolysis of Glycerol to Propylene Glycol," Applied Catalysis A: General 281:225-231 (2005).
Dass, D.V., et al., "A Comparative Study of the Conversion of Ethanol and of Ethylene Over the "Mobil" Zeolite Catalyst, H-ZSM-5. An Application of the Benzene Sequestration Test," Can. J. Chem. 67:1732-1734 (1989).
Davda, R.R., et al., "Aqueous-Phase Reforming of Ethylene Glycol on Silica-Supported Metal Catalysts," Applied Catalysis B: Environment 43:13-26 (2003).
Dos Santos, S.M., et al., "Performance of RuSn Catalysts Supported on different Oxides in the Selective Hydrogenation of Dimethyl Adipate," Catalysis Today 107-108:250-257 (2005).
Elliott, D.C., et al., "Chemical Processing in High-Pressure Aqueous Environments. 2. Development of Catalyts for Gasification," Ind. Eng. Chem. Res. 32: 1542-1548 (1993).
Elliott, D.C., et al., "Liquid Fuels by Low-Severity Hydrotreating of Biocrude," Developments in Thermochemical Biomass Conversion 1:611-621 (1996).
Elliott, D.C., et al., "Chemical Processing in High-Pressure Aqueous Environments 6. Demonstration of Catalytic Gasification for Chemical Manufacturing Wastewater Cleanup in Industrial Plants," Ind. Eng. Chem. Res. 38:879-883 (1999).
Fraser, J., "Roadmap for Cellulosic Ethanol Production".
Fukuoka, A., et al., "Catalytic Conversion of Cellulose Into Sugar Alcohols," Angew. Chem. Int. Ed. 5:5161-5163 (2006).
Gayubo, A.G., et al., "Transformation of Oxygenate Components of Biomass Pyrolysis Oil on a HZSM-5 Zeolite. I. Alcohols and Phenols," Ind. Eng. Chem. Res. 43:2610-2618 (2004).
Greer, D. "Creating Cellulosic Ethanol: Spinning Straw Into Fuel," May 2005 eNews Bulletin.
Huber, G.W., et al., "Raney Ni-Sn Catalyst for H2 Production From Biomass-Derived Hydrocarbons," Science 300:2075-2077 (2003).
Huber, G.W., et al., "Synthesis of Transportation Fuels From Biomass: Chemistry, Catalysts, and Engineering," Chem. Rev. 106: 4044-4098 (2006).
Kawai, M., et al., "Production of Hydrogen and Hydrocarbon From Cellulose and Water," Chemistry Letters P. 1185-1188 (1981).
Kluson, P., et al., "Selective Hydrogenation Over Ruthenium Catalysts," Applied Catalysis A: General 128:13-31 (1995).
Makarova, M.A., et al., "Dehydration of n-Butanol on Zeolite H-ZSM-5 and Amorphous Aluminosilicate: Detailed Mechanistic Study and the Effect of Pore Confinement," Journal of Catalysis 149:36-51 (1994).
Minowa, T., et al. "Hydrogen Production From Wet Cellulose by Low Temperature Gasification Using a Reduced Nickel Catalyst," Chemistry Letters p. 937-938 (1995).
Minowa, T., et al., "Hydrogen Production From Cellulose in Hot Compressed Water Using Reduced Nickel Catalyst: Product Distribution at Different Reaction Temperature," J. of Chem. Eng. of Japan 31:488-491 (1998).
Nelson, D.A., et al., "Application of Direct Thermal Liquefaction for the Conversion of Cellulosic Biomass," Ind. Eng. Chem. Prod. Res. Dev. 23:471-475 (1984).
Oregon Cellulose-Ethanol Study, "Appendix B—Overview of Cellulose-Ethanol Production Technology," p. 57-60.
Roman-Leshkov, Y., et al., "Production of Dimethylfuran for Liquid Fuels From Biomass-Derived Carbohydrates," Nature 447:982-986 (2007).
Rostrup-Nielsen, J.R., "Conversion of Hydrocarbons and Alcohols for Fuel Cells," Phys. Chem. Chem. Phys. 3:283-288 (2001).
Shabaker, J.W., et al., "Aqueous-Phase Reforming of Methanol and Ethylene Glycol over Alumina-Supported Platinum Catalysts," Journal of Catalysis 215:344-352 (2003).
Shabaker, J.W., et al., "Aqueous-Phase Reforming of Oxygenated Hydrocarbons Over Sn-Modified Ni Catalysts," Journal of Catalysis 222:180-191 (2004).
Silva, A.M., et al., "Role of Catalyst Preparation on Determining Selective Sites for Hydrogenation of Dimethyl Adipate Over RuSn/Al2O3," J. of Molecular Catalysis A: Chemical 253:62-69 (2006).
Tsuchida, T., et al., "Direct Synthesis of n-Butanol From Ethanol Over Nonstoichiometric Hyroxyapatite," Ind. Eng. Chem. Res. 45:8634-9642 (2006).
Wang, D., et al., "Catalytic Stream Reforming of Biomass-Derived Oxygenates: Acetic Acid and Hydroxyacetaldehyde," Applied Catalysis A: General 143:245-270 (1996).
Werpy, T., et al., "Top Value Added Chemicals From Biomass Volume 1—Results of Screening for Potential Candidates From Sugars and Synthesis Gas." (2004).
Yoshida, T., et al., "Gasification of Cellulose, Xylan, and Lignini Mixtures in Supercritical Water," Ind. Eng. Chem. Res. 40:5469-5474 (2001).
Blommel, P. G. et al., "Production of Conventional Liquid Fuels from Sugars," Aug. 25, 2008, pp. 1-14, Retrieved from the Internet: URL:http://www.Virent.com/BioForming/Virent_Technology_Whitepaper.pdf.
Zhou, J. H. et al., "Carbon nanofiber/graphite-felt composite supported Ru catalysts for hydrogenolysis of sorbitol," Catalysis Today, Elsevier, NL, vol. 147, Sep. 1, 2009, pp. S225-S229.
Clark, I. T., "Hydrogenolysis of Sorbitol," Industrial and Engineering Chemistry, American Chemical Society, US, vol. 50, No. 8, Jan. 1, 1958, pp. 1125-1126.
Denmark, Scott E. and Beuthner, Gregory L., "Lewis Base Catalysis in Organic Synthesis," Angew Chem. Int. Ed. 2008, 47, pp. 1560-1638.
Tanabe, K., Misono, M., Ono, Y., Hattori, H., "New Solid Acids and Bases," Kodansha/Elsevier, Tokyo/Amsterdam, 1989, pp. 260-267.
Gines, M., Iglesia, E., "Bifunctional Condensation Reactions of Alcohols on Basic Oxides Modified by Copper and Potassium," Journal of Catalysis, 1998, 176, pp. 155-172.
U.S. Appl. No. 12/972,159, filed Dec. 17, 2010, Chheda et al.
U.S. Appl. No. 13/106,509, filed May 12, 2011, Chheda et al.
U.S. Appl. No. 13/106,528, filed May 12, 2011, Chheda et al.
Brommel, P.G., et al., "Production of Conventional Liquid Fuels from Sugars", Aug. 2008, XP002631372 Internet: http://www.virent.com/BioForming/Virent_Technology_Whitepaper.pdf.
Elliott, D. C., "Historical Developments in Hydroprocessing Bio-Oils", Energy & Fuels, American Chemical Society, vol. 21, No. 3, May 2007, pp. 1792-1815.
Huber, G.W., et al., "An Overview of Aqueous-Phase Catalytic Processes for Production of Hydrogen and Alkanes in a Biorefinery", Catalysis Today, Elsevier, NL, vol. 111, No. 1-2, Jan. 2005, pp. 119-132.
Written Opinion of the International Searching Authority for PCT/US2010/061248 received Jun. 8, 2011.

\* cited by examiner

BIOFUELS VIA HYDROGENOLYSIS-CONDENSATION

The present application claims the benefit of U.S. Provisional Patent Application Ser. No. 61/291,567, filed Dec. 31, 2009 the entire disclosure of which is hereby incorporated by reference.

FIELD OF THE INVENTION

The invention relates to the production of higher hydrocarbons suitable for use in transportation fuels and industrial chemicals from bio-based feedstocks.

BACKGROUND OF THE INVENTION

A significant amount of effort has been placed on developing new methods and systems for providing energy from resources other than fossil fuels. Bio-based feedstocks are a resource that shows promise as a renewable alternative source of hydrocarbons for producing fuel and chemicals.

Bio-based feedstocks including carbohydrates and "biomass" are material derived from living or recently living biological materials. One type of biomass is cellulosic biomass. Cellulosic biomass is the most abundant source of carbohydrate in the world due to the lignocellulosic materials composing the cell walls. The ability to convert biomass to fuels, chemicals, energy and other materials is expected to strengthen the economy, minimize dependence on oil and gas resources, reduce air and water pollution, and decrease the net rate of carbon dioxide production.

There are many challenges to overcome in developing processes of converting carbohydrates to higher hydrocarbons suitable for use in transportation fuels. For example, the processes used are costly and complex making it difficult to compete with the use of traditional resources, such as fossil fuels. U.S. Patent Application Publication No. 2007/0142633 (Yao et al.) refers to a process for the conversion of carbohydrates to higher hydrocarbons. An ion-exchange resin is provided to convert the carbohydrates into usable reaction products. The reaction products are hydrogenated, and then contacted with a zeolite containing catalyst to form higher hydrocarbons. The conversion of carbohydrates to hydrocarbons in this system results in increased loss of desirable hydrocarbon products due to the formation of unwanted byproducts, such as coke, carbon dioxide, and carbon monoxide. Thus, another challenge for promoting and sustaining the use of biomass is the need to eliminate the formation of undesirable byproducts such as carbon monoxide, carbon dioxide, and coke. A further challenge is to complete the conversion of carbohydrates to higher hydrocarbons in a limited number of steps, to obtain high yields with minimal capital investment.

Current methods for converting sugars to fuel proceed through a biological route, such as yeast fermentation, to ethanol. However, ethanol does not have a high energy density when compared to standard transportation fuels. Currently, there is a need for the creation of liquid biofuels of greater energy density than ethanol, which can make use of existing fuel infrastructure. Moreover, what is needed is a method and system that provides efficient and high yield production of higher hydrocarbons suitable for use in transportation fuels and industrial chemicals from bio-based feedstocks while avoiding or minimizing the production of unwanted byproducts.

SUMMARY OF THE INVENTION

An embodiment of the invention comprises a method comprising providing a carbohydrate; reacting the carbohydrate directly with hydrogen in the presence of a hydrogenolysis catalyst to produce a reaction product comprising a polyol; and then processing at least a portion of the reaction product to form a fuel blend.

Another embodiment of the invention comprises a method comprising providing a source of bio-based feedstock; treating the bio-based feedstock so as to form a carbohydrate; reacting the carbohydrate in a hydrogenolysis reaction to produce reaction products comprising an alcohol, a polyol, and a higher polyol; recycling the higher polyol through the hydrogenation reaction to produce reaction products comprising an alcohol and a polyol; and processing at least a portion of the reaction products to form a fuel blend.

Still another embodiment of the invention comprises a system comprising a first vessel for receiving a carbohydrate and producing a hydrogenated product; a second vessel for receiving the hydrogenated product and producing an alcohol and a polyol; and a processing reactor for reacting the alcohol and polyol in the presence of a catalyst to produce a fuel blend.

The features and advantages of the invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the invention, and should not be used to limit or define the invention.

DETAILED DESCRIPTION OF THE INVENTION

The invention relates to methods and systems for producing higher hydrocarbons from bio-based feedstocks, such as carbohydrates, which include sugars, sugar alcohols, celluloses, lignocelluloses, hemicelluloses, lignocellulosic biomass, and any combination thereof, to form higher hydrocarbons suitable for use in transportation fuels and industrial chemicals, while minimizing the formation of undesirable by-products such as coke, carbon dioxide, and carbon monoxide. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than at least one component of the bio-based feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (e.g., oxygen or sulfur) and thus the term "hydrocarbon" may also include substituted hydrocarbons.

Figure 1:
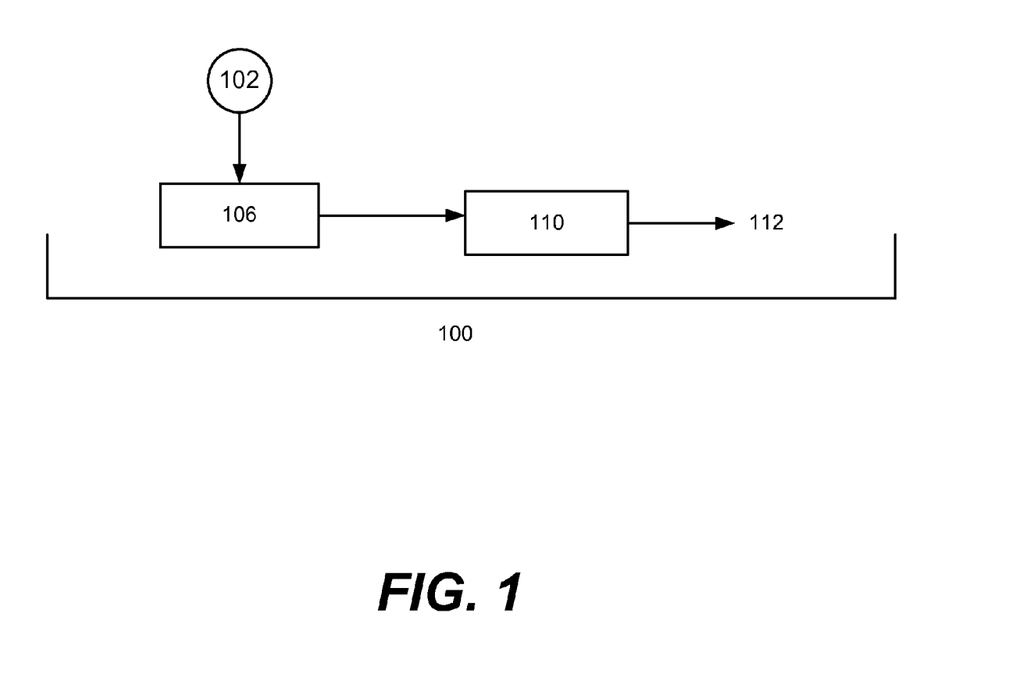
FIG. 1 schematically illustrates a block flow diagram of an embodiment of a higher hydrocarbon production process of this invention.
Figure 2:
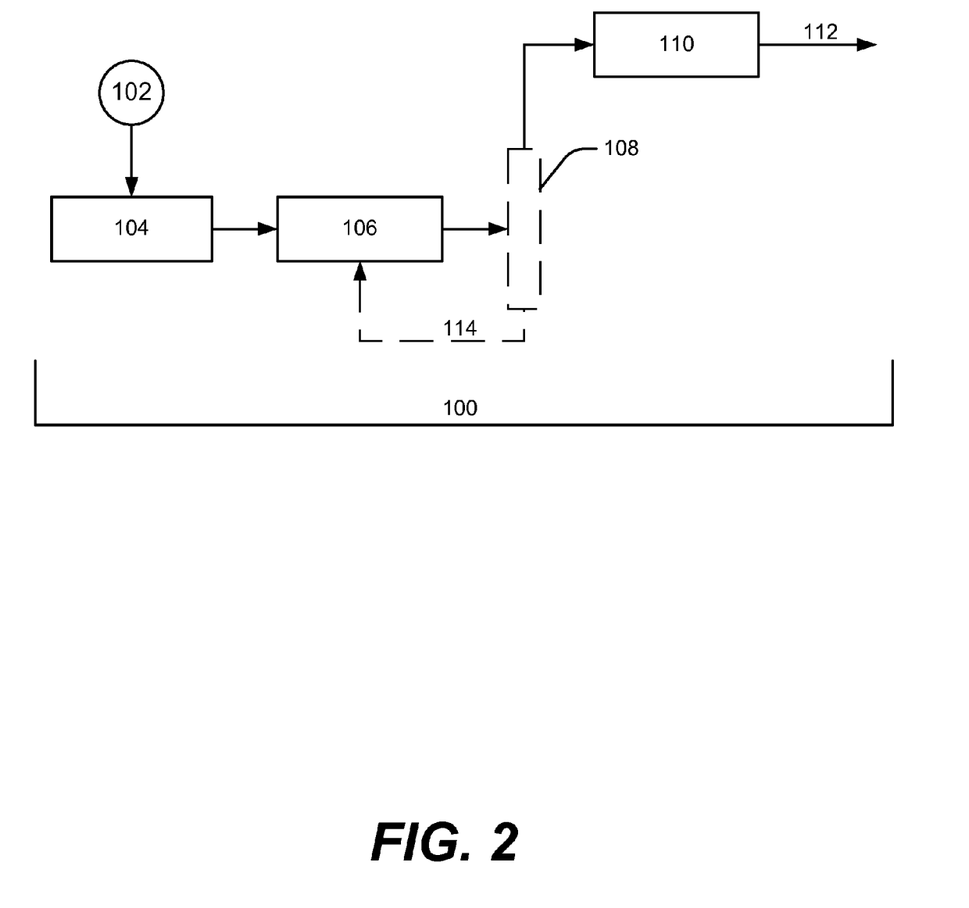
FIG. 2 schematically illustrates a block flow diagram of another embodiment of a higher hydrocarbon production process of this invention.
Figure 3:
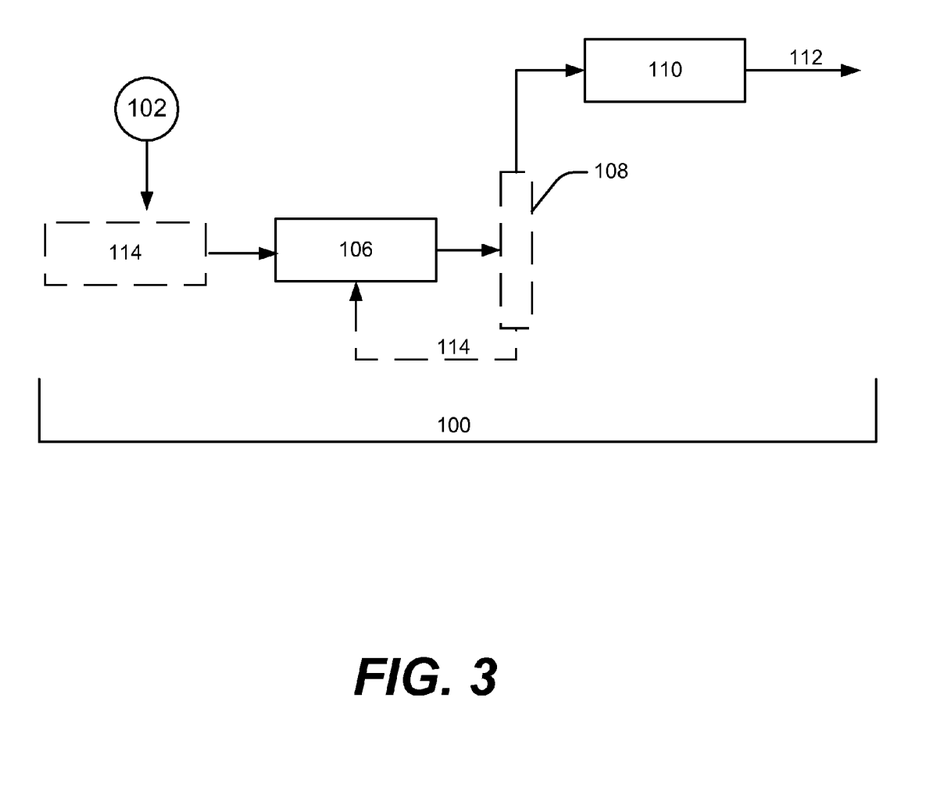
FIG. 3 schematically illustrates a block flow diagram of another embodiment of a higher hydrocarbon production process of this invention.

One embodiment of a process 100 described in the invention is illustrated in FIG. 1. Alternate embodiments are illustrated in FIGS. 2-3. In the embodiment shown in FIG. 1, a feedstock solution comprising water soluble carbohydrate 102 is catalytically reacted with hydrogen in a hydrogenolysis reaction 106 to produce desired reaction products. The reaction products are further catalytically reacted in processing reaction 110 to produce a higher hydrocarbon stream 112. Higher hydrocarbon stream 112 may be blended in a downstream process with additional streams to create fuels or industrial chemicals. Suitable reactions products may include, but are not limited to, alcohols, polyols, aldehydes, ketones, other oxygenated intermediates, and any combination thereof. Suitable processing reactions include, but are not limited to, condensation reactions, oligomerization reaction, hydrogenation reaction, and any combination thereof.

In the embodiment shown in FIG. 2, a feedstock solution comprising water soluble carbohydrate 102 is catalytically reacted with hydrogen in a hydrogenation reaction 104 and/or hydrogenolysis reaction 106 to produce desired reaction products. The reaction products are then passed through an optional separation device 108, and the suitable alcohols or polyols are further catalytically reacted in processing reaction 110 to produce a higher hydrocarbon stream 112. Higher hydrocarbon stream 112 may be blended in a downstream process with additional streams to create fuels or industrial chemicals. Suitable reactions products may include, but are not limited to, alcohols, polyols, aldehydes, ketones, other oxygenated intermediates, and any combination thereof. Higher polyols may be recycled back through the hydrogenolysis reaction 106 through recycle stream 114 to produce additional suitable alcohol and polyol reaction products. As used herein, the term "higher polyol" refers to a polyol with an oxygen to carbon ratio of 0.5 or more. Suitable processing reactions include, but are not limited to, condensation reactions, oligomerization reaction, hydrogenation reaction, and any combination thereof.

In the embodiment shown in FIG. 3, a feedstock solution comprising water soluble carbohydrate 102 is optionally hydrolyzed through a hydrolysis reaction 114 and further catalytically reacted with hydrogen in a hydrogenolysis reaction 106 to produce desired reaction products. The reaction products are then passed through an optional separation device 108, and the suitable alcohols or polyols are further catalytically reacted in processing reaction 110 to produce a higher hydrocarbon stream 112. Higher hydrocarbon stream 112 may be blended in a downstream process with additional streams to create fuels or industrial chemicals. Suitable reactions products may include, but are not limited to, alcohols, polyols, aldehydes, ketones, other oxygenated intermediates, and any combination thereof. Higher polyols may be recycled back through the hydrogenolysis reaction 106 through recycle stream 114 to produce additional suitable alcohol and polyol reaction products. As used herein, the term "higher polyol" refers to a polyol with an oxygen to carbon ratio of 0.5 or more. Suitable processing reactions include, but are not limited to, condensation reactions, oligomerization reaction, hydrogenation reaction, and any combination thereof.

In certain embodiments, the hydrolysis reaction, hydrogenation reaction, hydrogenolysis reaction, and processing reactions described in the present invention could be conducted in a single step.

In an embodiment, the reactions described below are carried out in any system of suitable design, including systems comprising continuous-flow, batch, semi-batch, or multi-system vessels and reactors. One or more reactions may take place in an individual vessel and the process is not limited to separate reaction vessels for each reaction. In an embodiment, the invention utilizes a fixed or fluidized catalytic bed system. Preferably, the invention is practiced using a continuous-flow system at steady-state.

The methods and systems of the invention have the advantage of converting bio-based feedstocks, optionally without any additional costly purification steps to form higher energy density product of lower oxygen/carbon ratio including higher alkanes, olefins, and aromatics. The invention also reduces the amount of unwanted byproducts, thereby improving the overall yield of converting carbohydrates to higher hydrocarbons. Another advantage of the present invention includes the use of similar catalysts for multiple reaction steps, offering the potential to combine reactions when desired. A further advantage of the present invention provides the combination or elimination of steps required to convert bio-based feedstocks to fuel, thereby reducing capital costs. Advantages of specific embodiments will be described in more detail below.

An embodiment of the invention comprises a method comprising providing a carbohydrate; reacting the carbohydrate directly with hydrogen in the presence of a hydrogenolysis catalyst to produce a reaction product comprising a polyol; and then processing at least a portion of the reaction product to form a fuel blend.

Carbohydrates are the most abundant, naturally occurring biomolecules. Plant materials store carbohydrates either as sugars, starches, celluloses, lignocelluloses, hemicelluloses, and any combination thereof. In one embodiment, the carbohydrates include monosaccharides, polysaccharides or mixtures of monosaccharides and polysaccharides. As used herein, the term "monosaccharides" refers to hydroxy aldehydes or hydroxy ketones that cannot be hydrolyzed to smaller units. Examples of monosaccharides include, but are not limited to, dextrose, glucose, fructose and galactose. As used herein, the term "polysaccharides" refers to saccharides comprising two or more monosaccharide units. Examples of polysaccharides include, but are not limited to, sucrose, maltose, cellobiose, cellulose and lactose. Carbohydrates are produced during photosynthesis, a process in which carbon dioxide is converted into organic compounds as a way to store energy. The carbohydrates are highly reactive compounds that can be easily oxidized to generate energy, carbon dioxide, and water. The presence of oxygen in the molecular structure of carbohydrates contributes to the reactivity of the compound. Water soluble carbohydrates react with hydrogen over catalyst(s) to generate polyols and sugar alcohols, either by hydrogenation, hydrogenolysis or both.

In the embodiment shown in FIG. 1, the carbohydrates are optionally passed through a hydrogenation reaction and then a hydrogenolysis reaction to form suitable reaction products that comprise alcohols and polyols for the condensation reaction 110. In an embodiment of the invention, the hydrogenation reaction is optional and the hydrogenolysis reaction alone is enough to form the appropriate polyol and alcohol compounds. In another embodiment of the invention, the carbohydrates are passed through the hydrogenolysis vessel prior to being passed through the hydrogenation vessel (thus hydrogenolysis reaction 106 and hydrogenation reaction 104 are reversed from the order shown in FIG. 1). In yet another embodiment of the invention, the hydrogenation and hydrogenolysis reactions occur in the same vessel to generate polyols and alcohols to be fed into the condensation reaction. In a final embodiment, a separation step (water removal) could be conducted prior to the hydrogenolysis reaction.

The carbohydrates may originate from any suitable source. In an embodiment, carbohydrates may be fed to the process that are derived from organic sources (e.g., sugars and starches from corn or sugarcane). In another embodiment, the carbohydrates are derived from bio-based feedstocks. Bio-based feedstocks can include biomass. As used herein, the term "biomass" means organic materials produced by plants (e.g., leaves, roots, seeds and stalks), and microbial and animal metabolic wastes. Common sources of biomass include: agricultural wastes (e.g., corn stalks, straw, seed hulls, sugarcane leavings, bagasse, nutshells, and manure from cattle, poultry, and hogs); wood materials (e.g., wood or bark, sawdust, timber slash, and mill scrap); municipal waste, (e.g., waste paper and yard clippings); and energy crops, (e.g., poplars, willows, switch grass, alfalfa, prairie bluestream, corn, and soybean). The term "biomass" also refers to the primary building blocks of all the above, including, but not limited to, saccharides, lignins, celluloses, hemicelluloses, and starches. Useful carbohydrates in the invention include, but are not limited to, carbohydrates that can be converted to hydrocarbons under suitable reaction conditions. Suitable carbohydrates in the invention include any carbohydrate soluble in water or an organic solvent having one or more carbon atoms and at least one oxygen atom. The carbohydrates may also have an oxygen to carbon ratio from 0.5:1 to 1:1.2.

In one embodiment of the invention, the bio-based feedstock is optionally first hydrolyzed in a liquid medium such as an aqueous solution to obtain an intermediate carbohydrate stream for use in the process. There are various suitable biomass hydrolysis methods, including, but not limited to, acid hydrolysis, alkaline hydrolysis, enzymatic hydrolysis, and hydrolysis using hot-compressed water. In certain embodiments, the hydrolysis reaction can occur at a temperature between 100° C. and 250° C. and pressure between 1 atm and 100 atm. In embodiments including strong acid and enzymatic hydrolysis, the hydrolysis reaction can occur at temperatures as low as ambient temperature and pressure between 1 atm and 100 atm. In some embodiments, the hydrolysis reaction may comprise a hydrolysis catalyst (e.g., a metal or acid catalyst) to aid in the hydrolysis reaction. The hydrolysis catalyst can be any catalyst capable of effecting a hydrolysis reaction. For example, suitable hydrolysis catalysts include, but are not limited to, acid catalysts, base catalysts, and metal catalysts. Acid catalysts can include organic acides such as acetic acid, formic acid, and levulinic acid. In an embodiment, the acid catalyst can be generated as byproducts during the hydrogenation and/or hydrogenolysis reactions. In certain embodiments, the hydrolysis of the bio-based feedstocks can occur in conjunction with the hydrogenation and/or hydrogenolysis reactions. In such embodiments, a co-catalyst or catalytic support may be added to the hydrogenation and/or hydrogenolysis reactions to facilitate the hydrolysis reaction.

Various factors affect the conversion of the bio-based feedstock in the hydrolysis reaction. In some embodiments, hemi-cellulose can be extracted from the bio-based feedstock within an aqueous fluid and hydrolyzed at temperatures below 160° C. to produce a $C_5$ carbohydrate fraction. At increasing temperatures, this $C_5$ fraction can be thermally degraded. It is therefore advantageous to convert the $C_5$, $C_6$, or other sugar intermediates directly into more stable intermediates such as sugar alcohols. By recycling the oxygenated intermediates from the hydrogenation and/or hydrogenolysis reactions and performing additional biomass hydrolysis with this recycled liquid, the concentration of active oxygenated intermediates can be increased to commercially viable concentrations without water dilution. Typically, a concentration of at least 2%, or 5% or preferable greater than 8% of organic intermediates in water, may be suitable for a viable process. This may be determined by sampling the intermediate stream at the outlet of the hydrolysis reaction and using a suitable technique such as chromatography to identify the concentration of total organics. The oxygenated intermediate stream has a fuel forming potential, as described below.

Cellulose extraction begins above 160° C., with solubilization and hydrolysis becoming complete at temperatures around 190° C., aided by organic acids (e.g., carboxylic acids) formed from partial degradation of carbohydrate components. Some lignins can be solubilized before cellulose, while other lignins may persist to higher temperatures. Organic in situ generated solvents, which may comprise a portion of the oxygenated intermediates, including, but not limited to, light alcohols and polyols, can assist in solubilization and extraction of lignin and other components.

At temperatures ranging from 250° C. to 275° C., carbohydrates can degrade through a series of complex self-condensation reactions to form caramelans, which are considered degradation products that are difficult to convert to fuel products. In general, some degradation reactions can be expected with aqueous reaction conditions upon application of temperature, given that water will not completely suppress oligomerization and polymerization reactions.

The temperature of the hydrolysis reaction can be chosen so that the maximum amount of extractable carbohydrates are hydrolyzed and extracted as carbohydrates from the bio-based feedstock while limiting the formation of degradation products. In some embodiments, a plurality of reactor vessels may be used to carry out the hydrolysis reaction. These vessels may have any design capable of carrying out a hydrolysis reaction. Suitable reactor vessel designs can include, but are not limited to, co-current, counter-current, stirred tank, or fluidized bed reactors. In this embodiment, the bio-based feedstock may first be introduced into a reactor vessel operating at approximately 160° C. At this temperature the hemicellulose may be hydrolyzed to extract the $C_5$ carbohydrates and some lignin without degrading these products. The remaining bio-based feedstock solids may then exit the first reactor vessel and pass to a second reactor vessel. The second vessel may be operated between 160° C. and 250° C. so that the cellulose is further hydrolyzed to form $C_6$ carbohydrates. The remaining bio-based feedstock solids may then exit the second reactor as a waste stream while the intermediate stream from the second reactor can be cooled and combined with the intermediate stream from the first reactor vessel. The combined outlet stream may then pass to the hydrogenation and/or hydrogenolysis reactors. In another embodiment, a series of reactor vessels may be used with an increasing temperature profile so that a desired carbohydrate fraction is extracted in each vessel. The outlet of each vessel can then be cooled prior to combining the streams, or the streams can be individually fed to the hydrogenation/and or hydrogenolysis reaction for conversion of the intermediate carbohydrate streams to one or more oxygenated intermediate streams.

In another embodiment, the hydrolysis reaction may take place in a single vessel. This vessel may have any design capable of carrying out a hydrolysis reaction. Suitable reactor vessel designs can include, but are not limited to, co-current, counter-current, stirred tank, or fluidized bed reactors. In some embodiments, a counter-current reactor design is used in which the bio-based feedstock flows counter-current to the aqueous stream, which may comprise an in situ generated solvent. In this embodiment, a temperature profile may exist within the reactor vessel so that the temperature within the hydrolysis reaction media at or near the bio-based feedstock inlet is approximately 160° C. and the temperature near the bio-based feedstock outlet is approximately 200° C. to 250° C. The temperature profile may be obtained through the introduction of an aqueous fluid comprising an in situ generated solvent above 200° C. to 250° C. near the bio-based feedstock outlet while simultaneously introducing a bio-based feedstock at 160° C. or below. The specific inlet temperature of the aqueous fluid and the bio-based feedstock will be determined based a heat balance between the two streams. The resulting temperature profile may be useful for the hydrolysis and extraction of cellulose, lignin, and hemicellulose without the substantial production of degradation products.

Other means may be used to establish an appropriate temperature profile for the hydrolysis reaction and extraction of cellulose and hemicellulose along with other components such as lignin without substantially producing degradation products. For example, internal heat exchange structures may be used within one or more reaction vessels to maintain a desired temperature profile for the hydrolysis reaction. Other structures as would be known to one of ordinary skill in the art may also be used.

Each reactor vessel of the invention preferably includes an inlet and an outlet adapted to remove the product stream from the vessel or reactor. In some embodiments, the vessel in which hydrolysis reaction or some portion of the hydrolysis reaction occurs may include additional outlets to allow for the removal of portions of the reactant stream to help maximize the desired product formation. Suitable reactor designs can include, but are not limited to, a backmixed reactor (e.g., a stirred tank, a bubble column, and/or a jet mixed reactor) may be employed if the viscosity and characteristics of the partially digested bio-based feedstock and liquid reaction media is sufficient to operate in a regime where bio-based feedstock solids are suspended in an excess liquid phase (as opposed to a stacked pile digester).

It is understood that in one embodiment, the biomass does not need to be hydrolyzed, as the carbohydrate containing biomass may already be in suitable aqueous form (e.g., raw cane juice concentrate) for converting the bio-based feedstock to higher hydrocarbons.

In an embodiment of the invention, the intermediate carbohydrate stream produced by the hydrolysis reaction may be partially de-oxygenated. In another embodiment of the invention, the bio-based feed may be completely de-oxygenated. The de-oxygenation reactions form desired products, including, but not limited to, polyols, alcohols, ketones, aldehydes, and hydroxy carboxylic acids or carboxylic acid for use in later condensation reactions. In general, without being limited by any particular theory, the deoxygenation reactions involve a combination of various different reaction pathways, including without limitation: hydrogenolysis, hydrogenation, consecutive hydrogenation-hydrogenolysis, consecutive hydrogenolysis-hydrogenation, and combined hydrogenation-hydrogenolysis reactions, resulting in at least the partial removal of oxygen from the carbohydrate to produce reaction products that can be easily converted to higher hydrocarbons by a condensation reaction.

In an embodiment of the invention, a hydrolyzed, substantially hydrolyzed, or non-hydrolyzed biomass-derived carbohydrate is converted into its corresponding alcohol derivative through a hydrogenation reaction in a suitable hydrogenation reaction vessel (such as hydrogenation reactor 104 in FIG. 1).

The carbohydrates, oxygenated intermediates from the hydrolysis reaction, or both may take place in a hydrogenation reaction to saturate one or more unsaturated bonds. Various processes are suitable for hydrogenating carbohydrates, oxygenated intermediated or both. One method includes contacting the feed stream with hydrogen or hydrogen mixed with a suitable gas and a catalyst under conditions sufficient to cause a hydrogenation reaction to form a hydrogenated product. The hydrogenation catalyst generally can include Group VIII metals and Group VI metals. Examples of such catalysts include, but are not limited to, Cu, Re, Ni, Fe, Co, Ru, Pd, Rh, Pt, Os, Ir, and alloys or any combination thereof, either alone or with promoters such as W, Mo, Au, Ag, Cr, Zn, Mn, Sn, B, P, Bi, and alloys or any combination thereof. Other effective hydrogenation catalyst materials include either supported nickel or ruthenium modified with rhenium. In an embodiment, the hydrogenation catalyst also includes any one of the supports, depending on the desired functionality of the catalyst. The hydrogenation catalysts may be prepared by methods known to those of ordinary skill in the art.

In an embodiment the hydrogenation catalyst includes a supported Group VIII metal catalyst and a metal sponge material (e.g., a sponge nickel catalyst). Raney nickel provides an example of an activated sponge nickel catalyst suitable for use in this invention. In an embodiment, the hydrogenation reaction in the invention is performed using a catalyst comprising a nickel-rhenium catalyst or a tungsten-modified nickel catalyst. One example of a suitable catalyst for the hydrogenation reaction of the invention is a carbon-supported nickel-rhenium catalyst.

In an embodiment, a suitable Raney nickel catalyst may be prepared by treating an alloy of approximately equal amounts by weight of nickel and aluminum with an aqueous alkali solution, e.g., containing about 25 weight % of sodium hydroxide. The aluminum is selectively dissolved by the aqueous alkali solution resulting in a sponge shaped material comprising mostly nickel with minor amounts of aluminum. The initial alloy includes promoter metals (i.e., molybdenum or chromium) in the amount such that 1 to 2 weight % remains in the formed sponge nickel catalyst. In another embodiment, the hydrogenation catalyst is prepared using a solution of ruthenium(III) nitrosylnitrate, ruthenium (III) chloride in water to impregnate a suitable support material. The solution is then dried to form a solid having a water content of less than 1% by weight. The solid is then reduced at atmospheric pressure in a hydrogen stream at 300° C. (uncalcined) or 400° C. (calcined) in a rotary ball furnace for 4 hours. After cooling and rendering the catalyst inert with nitrogen, 5% by volume of oxygen in nitrogen is passed over the catalyst for 2 hours.

In certain embodiments, the catalyst described includes a catalyst support. The catalyst support stabilizes and supports the catalyst. The type of catalyst support used depends on the chosen catalyst and the reaction conditions. Suitable supports for the invention include, but are not limited to, carbon, silica, silica-alumina, zirconia, titania, ceria, vanadia, nitride, boron nitride, heteropolyacids, hydroxyapatite, zinc oxide, chromia, zeolites, carbon nanotubes, carbon fullerene and any combination thereof.

The catalysts used in this invention can be prepared using conventional methods known to those in the art. Suitable methods may include, but are not limited to, incipient wetting, evaporative impregnation, chemical vapor deposition, wash-coating, magnetron sputtering techniques, and the like.

The conditions for which to carry out the hyrdogenation reaction will vary based on the type of starting material and the desired products. One of ordinary skill in the art, with the benefit of this disclosure, will recognize the appropriate reaction conditions. In general, the hydrogenation reaction is conducted at temperatures of 40° C. to 250° C., and preferably at 90° C. to 200° C., and most preferably at 100° C. to 150° C. In an embodiment, the hydrogenation reaction is conducted at pressures from 500 KPa to 14000 KPa.

In some embodiments, a plurality of reactor vessels may be used to carry out the hydrogenation reaction. These stages may be capable of carrying out a hydrogenation reaction without producing unwanted byproducts while minimizing degradation of wanted products. In on embodiment, the hydrogenation reaction may occur in two or more stages. In this embodiment, the bio-based feedstock may first be introduced into a first stage reaction operating at a temperature between 40° C. to 90° C. The products may then be exposed to a second stage reaction operating at a temperature between 80° C. to 120° C. The remaining products may then be exposed to a third stage operating at a temperature between 100° C. and 175° C.

In an embodiment, the hydrogen used in the hydrogenation reaction of the current invention can include external hydrogen, recycled hydrogen, in situ generated hydrogen, and any combination thereof. As used herein, the term "external hydrogen" refers to hydrogen that does not originate from the bio-based feedstock reaction itself, but rather is added to the system from another source.

In an embodiment, the invention comprises a system having a first vessel for receiving a carbohydrate and producing a hydrogenated product. Each vessel of the invention preferably includes an inlet and an outlet adapted to remove the product stream from the vessel or reactor. In an embodiment, the vessels and reactors include additional outlets to allow for the removal of portions of the reactant stream to help maximize the desired product formation, and allow for collection and recycling of byproducts for use in other portions of the system.

In an embodiment, the system of the invention includes elements that allow for the separation of the intermediate stream into different components to promote the desired products being fed into the desired reactions. For example, a suitable separator unit includes, but is not limited to, a phase separator, stripping column, extractor, or distillation column.

In an embodiment of the invention, it is desirable to convert the carbohydrates and oxygenated intermediates from the hydrolysis reaction and hydrogenation reaction to a smaller molecule that will be more readily converted to desired higher hydrocarbons. A suitable method for this conversion is through a hydrogenolysis reaction.

Various processes are known for performing hydrogenolysis of carbohydrates. One suitable method includes contacting a carbohydrate or oxygenated intermediate with hydrogen or hydrogen mixed with a suitable gas and a hydrogenolysis catalyst in a hydrogenolysis reaction under conditions sufficient to form a reaction product comprising smaller molecules or polyols. As used herein, the term "smaller molecules or polyols" includes any molecule that has a smaller molecular weight, which can include a smaller number of carbon atoms or oxygen atoms than the starting carbohydrate. In an embodiment, the reaction products include smaller molecules that include polyols and alcohols. Someone of ordinary skill in the art would be able to choose the appropriate method by which to carry out the hydrogenolysis reaction.

In an embodiment, a 5 and/or 6 carbon carbohydrate molecule can be converted to propylene glycol, ethylene glycol, and glycerol using a hydrogenolysis reaction in the presence of a hydrogenolysis catalyst. The hydrogenolysis catalyst may include Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. The hydrogenolysis catalyst can also include a carbonaceous pyropolymer catalyst containing transition metals (e.g., chromium, molybdemum, tungsten, rhenium, manganese, copper, cadmium) or Group VIII metals (e.g., iron, cobalt, nickel, platinum, palladium, rhodium, ruthenium, iridium, and osmium). In certain embodiments, the hydrogenolysis catalyst can include any of the above metals combined with an alkaline earth metal oxide or adhered to a catalytically active support. In certain embodiments, the catalyst described in the hydrogenolysis reaction can include a catalyst support as described above for the hydrogenation reaction.

The conditions for which to carry out the hydrogenolysis reaction will vary based on the type of starting material and the desired products. One of ordinary skill in the art, with the benefit of this disclosure, will recognize the appropriate conditions to use to carry out the reaction. In general, the hydrogenolysis reaction is conducted at temperatures of 110° C. to 300° C., and preferably at 170° C. to 220° C., and most preferably at 180° C. to 225° C. In an embodiment, the hydrogenolysis reaction is conducted under basic conditions, preferably at a pH of 8 to 13, and even more preferably at a pH of 10 to 12. In an embodiment, the hydrogenolysis reaction is conducted at pressures in a range between 60 KPa and 16500 KPa, and preferably in a range between 1700 KPa and 14000 KPa, and even more preferably between 4800 KPa and 11000 KPa.

The hydrogen used in the hydrogenolysis reaction of the current invention can include external hydrogen, recycled hydrogen, in situ generated hydrogen, and any combination thereof.

In an embodiment, the use of a hydrogenolysis reaction may produce less carbon dioxide and a greater amount of polyols than a reaction that results in reforming of the reactants. For example, reforming can be illustrated by formation of isopropanol (i.e., IPA, or 2-propanol) from sorbitol:

$$C_6H_{14}O_6 + H_2O \rightarrow 4H_2 + 3CO_2 + 1C_3H_8O; \; d\text{HR} = -40\text{J/g-mol} \quad (\text{Eq. 1})$$

Alternately, in the presence of hydrogen, polyols and mono-oxygenates such as IPA can be formed by hydrogenolysis, where hydrogen is consumed rather produced:

$$C_6H_{14}O_6 + 3H_2 \rightarrow 2H_2O + 2C_3H_8O_2; \; d\text{HR} = +81\text{J/gmol} \quad (\text{Eq. 2})$$

$$C_6H_{14}O_6 + 5H_2 \rightarrow 4H_2O + 2C_3H_8O; \; d\text{HR} = -339\text{J/gmol} \quad (\text{Eq. 3})$$

As a result of the differences in the reaction conditions (e.g., temperatures below 250° C.), the products of the hydrolgenolysis reaction may comprise greater than 25% by mole, or alternatively, greater than 30% by mole, of polyols, which may result in a greater conversion in the processing reactions. In addition, the use of a hydrolysis reaction rather than a reaction running at reforming conditions may result in less than 20% by mole, or alternatively less than 30% by mole carbon dioxide production.

In an embodiment, the invention comprises a system having a second vessel for receiving the hydrogenated product and converting it into an alcohol and a polyol. In certain embodiments, the hydrogenation and hydrogenolysis catalysts are the same and may exist in the same bed in the same vessel. Each vessel of the invention preferably includes an inlet and an outlet adapted to remove the product stream from the vessel or reactor. In an embodiment, the vessels and reactors include additional outlets to allow for the removal of portions of the reactant stream to help maximize the desired product formation, and allow for collection and recycling of byproducts for use in other portions of the system.

In a separate embodiment, hydrogenolysis is conducted under neutral or acidic conditions, as needed to accelerate hydrolysis reactions in addition to the hydrogenolysis.

In an embodiment of the invention, a separator is installed prior to the condensation reaction to favor production of higher hydrocarbons by separating the higher polyols from polyols and alcohols. In such an embodiment, the higher polyols and unconverted feed are recycled back through the hydrogenolysis vessel with the aid of an additional outlet, while the other reaction products are streamed to the condensation reactor.

In some embodiments, the oxygenated intermediates are converted to a fuel blend that can be used as a fuel additive through hydrogenation of the oxygenated intermediates. Various processes are suitable for hydrogenating the oxygenated intermediates. One method includes contacting the feed stream with hydrogen or hydrogen mixed with a suitable gas and a catalyst under conditions sufficient to cause a hydrogenation reaction to form a hydrogenated product. Suitable catalysts and reaction conditions are described above.

The hydrogenation of the oxygenated intermediates may produce one or more saturated alcohols, polyols, or hydrocarbons. The alcohols produced in the invention have from 2 to 30 carbon atoms. In some embodiments, the alcohols are cyclic. In another embodiment, the alcohols are branched. In another embodiment, the alcohols are straight chained. Suitable alcohols for the invention include, but are not limited to, butanol, pentanol, hexanol, heptanol, octanol, nonanol, decanol, undecanol, dodecanol, tridecanol, tetradecanol, pentadecanol, hexadecanol, heptyldecanol, octyldecanol, nonyldecanol, eicosanol, uneicosanol, doeicosanol, trieicosanol, tetraeicosanol, and isomers thereof.

The saturated alcohols, polyols, and/or hydrocarbons may be used as a fuel blend additive in transportation or other fuels. In addition, the products may be sold as commodity chemical for further uses known to one of ordinary skill in the art.

In some other embodiments, the oxygenated intermediates discussed above can be converted into higher hydrocarbons through a condensation reaction in a condensation reactor (shown schematically as condensation reaction 110 in FIG. 1). In such an embodiment, condensation of the oxygenated intermediates occurs in the presence of a catalyst capable of forming higher hydrocarbons. While not intending to be limited by theory, it is believed that the production of higher hydrocarbons proceeds through a stepwise addition reaction including the formation of a carbon-carbon, or a carbon-oxygen bond. The resulting reaction products include any number of compounds containing these moieties, as described in more detail below.

In some embodiments, an outlet stream containing at least a portion of the oxygenated intermediates can pass to a condensation reaction. The condensation reaction can comprise a variety of catalysts for condensing one or more oxygenated intermediates to higher hydrocarbons. The higher hydrocarbons may comprise a fuel product. The fuel products produced by the condensation reactor represent the product stream from the overall process at higher hydrocarbon stream. In an embodiment, the oxygen to carbon ratio of the higher hydrocarbons produced through the condensation reaction is less than 0.5, alternatively less than 0.4, or preferably less than 0.3.

In certain embodiments, suitable condensation catalysts include an acid catalyst, a base catalyst, or an acid/base catalyst. As used herein, the term "acid/base catalyst" refers to a catalyst that has both an acid and a base functionality or functional sites. In an embodiment the condensation catalyst can include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In an embodiment, the condensation catalyst can also include a modifier. Suitable modifiers include La, Y, Sc, P, B, Bi, Li, Na, K, Rb, Cs, Mg, Ca, Sr, Ba, and any combination thereof. In an embodiment, the condensation catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof.

In certain embodiments, the catalyst described in the condensation reaction can include a catalyst support as described above for the hydrogenation reaction. In certain embodiments, the condensation catalyst is self-supporting. As used herein, the term "self-supporting" means that the catalyst does not need another material to serve as support. In another embodiment, the condensation catalyst in used in conjunction with a separate support suitable for suspending the catalyst. In an embodiment, the condensation catalyst support is silica.

The conditions for which to carry out the condensation reaction will vary based on the type of starting material and the desired products. One of ordinary skill in the art, with the benefit of this disclosure, will recognize the appropriate conditions to use to carry out the reaction. In an embodiment, the condensation reaction is carried out at a temperature at which the thermodynamics for the proposed reaction are favorable. The temperature for the condensation reaction will vary depending on the specific starting polyol or alcohol. In an embodiment, the temperature for the condensation reaction is in a range from 80° C. to 500° C., and preferably from 125° C. to 450° C., and more preferably from 175° C. to 400° C. In an embodiment, the condensation reaction is conducted at pressures generally in a range between 0 Kpa to 9000 KPa, and preferably in a range between 0 KPa and 7000 KPa, and even more preferably between 0 KPa and 5000 KPa.

In an embodiment, the invention comprises a system having a condensation reactor for reacting the alcohol and polyol products from the hydrogenation and hydrogenolysis reaction(s) in the presence of a condensation catalyst to produce at least some higher fuel forming hydrocarbons. In certain embodiments, the hydrogenation and hydrogenolysis catalysts are the same and may exist in the same bed in the same vessel. Each reactor of the invention preferably includes an inlet and an outlet adapted to remove the product stream from the reactor. In an embodiment, the reactors include additional outlets to allow for the removal of portions of the reactant stream to help maximize the desired product formation, and allow for collection and recycling of byproducts for use in other portions of the system.

The higher hydrocarbons formed by the invention can include a broad range of compounds depending on the reaction conditions and the composition of the oxygenated intermediates fed to the reaction. Exemplary higher hydrocarbons include, but are not limited to, branched or straight chain alkanes that have from 4 to 30 carbon atoms, branched or straight chain alkenes that have from 4 to 30 carbon atoms, cycloalkanes that have from 5 to 30 carbon atoms, cycloalkenes that have from 5 to 30 carbon atoms, aryls, fused aryls, alcohols, and ketones. Suitable alkanes include, but are not limited to, butane, pentane, pentene, 2-methylbutane, hexane, hexene, 2-methylpentane, 3-methylpentane, 2,2,-dimethylbutane, 2,3-dimethylbutane, heptane, heptene, octane, octene, 2,2,4-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, nonyldecane, nonyldecene, eicosane, eicosene, uneicosane, uneicosene, doeicosane, doeicosene, trieicosane, trieicosene, tetraeicosane, tetraeicosene, and isomers thereof.

In an embodiment, the cycloalkanes and the cycloalkenes are unsubstituted. In another embodiment, the cycloalkanes and cycloalkenes are mono-substituted. In yet another embodiment, the cycloalkanes and cycloalkenes are multi-substituted. In the embodiments comprising the substituted cycloalkanes and cycloalkenes, the substituted group includes, without limitation, a branched or straight chain alkyl having 1 to 12 carbon atoms, a branched or straight chain alkylene having 1 to 12 carbon atoms, a phenyl, and any combination thereof. Suitable cycloalkanes and cycloalkenes include, but are not limited to, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, isomers and any combination thereof.

In an embodiment, the aryls formed are unsubstituted. In another embodiment, the aryls formed are mono-substituted or multi-substituted. In the embodiments comprising the substituted aryls, the substituted group includes, without limitation, a branched or straight chain alkyl having 1 to 12 carbon atoms, a branched or straight chain alkylene having 1 to 12 carbon atoms, a phenyl, and any combination thereof. Suitable aryls for the invention include, but are not limited to, benzene, toluene, xylene, ethyl benzene, para xylene, meta xylene, and any combination thereof.

The alcohols produced in the invention have from 2 to 30 carbon atoms. In an embodiment, the alcohols are cyclic. In another embodiment, the alcohols are branched. In another embodiment, the alcohols are straight chained. Suitable alcohols for the invention include, but are not limited to, butanol, pentanol, hexanol, heptanol, octanol, nonanol, decanol, undecanol, dodecanol, tridecanol, tetradecanol, pentadecanol, hexadecanol, heptyldecanol, octyldecanol, nonyldecanol, eicosanol, uneicosanol, doeicosanol, trieicosanol, tetraeicosanol, and isomers thereof.

The ketones produced in the invention have from 2 to 30 carbon atoms. In an embodiment, the ketones are cyclic. In another embodiment, the ketones are branched. In another embodiment, the ketones are straight chained. Suitable ketones for the invention include, but are not limited to, butanone, pentanone, hexanone, heptanone, octanone, nonanone, decanone, undecanone, dodecanone, tridecanone, tetradecanone, pentadecanone, hexadecanone, heptyldecanone, octyldecanone, nonyldecanone, eicosanone, uneicosanone, doeicosanone, trieicosanone, tetraeicosanone, and isomers thereof.

In an embodiment, the condensation reaction may produce a fuel blend comprising gasoline hydrocarbons (i.e., a gasoline fuel). "Gasoline hydrocarbons" refer to hydrocarbons predominantly comprising $C_{5-9}$ hydrocarbons, for example, $C_{6-8}$ hydrocarbons, and having a boiling point range from 32° C. (90° F.) to about 204° C. (400° F.). Gasoline hydrocarbons include, but are not limited to, straight run gasoline, naphtha, fluidized or thermally catalytically cracked gasoline, VB gasoline, and coker gasoline. Gasoline hydrocarbons content is determined by ASTM Method D2887.

In this embodiment, the condensation reaction may be carried out at a temperature at which the thermodynamics for the proposed reaction are favorable for the formation of $C_{5-9}$ hydrocarbons. The temperature for the condensation reaction will generally be in a range from 275° C. to 500° C., and preferably from 300° C. to 450° C., and most preferably from 325° C. to 400° C. The condensation reaction can be conducted at pressures in a range between 0 Kpa to 9000 KPa, and preferably in a range between 0 KPa and 7000 KPa, and even more preferably between 0 KPa and 5000 KPa.

The resulting gasoline hydrocarbons may be subjected to additional processes to treat the fuel blend to remove certain components or further conform the fuel blend to a gasoline fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a gasoline fuel standard). The hydrogenation step of the fuel blend stream can be carried out according to the known procedures, either with a continuous or batch method. In particular, it can be effected by feeding hydrogen at a pressure ranging from 5 bar to 20 bar and at a temperature ranging from 50° C. to 150° C. and reacting for a time varying from 2 to 20 hours in the presence of a hydrogenation catalyst such as a supported palladium or platinum, for example 5% by weight of palladium or platinum on activated carbon.

Isomerization may be used to treat the fuel blend to introduced a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 20 bar to 150 bar, preferably in the range of 20 bar to 100 bar, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Thus, in one embodiment, the fuel blend produced by the processes described herein is a hydrocarbon mixture that meets the requirements for a gasoline fuel (i.e., conforms with ASTM D2887).

In an embodiment, the condensation reaction may produce a fuel blend meeting the requirements for a diesel fuel or jet fuel. Traditional diesel fuels are petroleum distillates rich in paraffinic hydrocarbons. They have boiling ranges as broad as 370° F. to 780° F., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

The present invention also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosone-type Airplane fuel (including Jet A and Jet A-1) has a carbon number distribution between about C8 and C16. Wide-cut or naphtha-type Aeroplane fuel (including Jet B) typically has a carbon number distribution between about $C_5$ and $C_{15}$. A fuel blend meeting ASTM D1655 can be defined as jet fuel.

Both Airplanes (Jet A and Jet B) may contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A are used for civilian and military fuels and DCI-6A is used for military fuels. FSII agents, include, e.g., Di-EGME.

A fuel blend meeting the requirements for a diesel fuel (e.g., ASTM D975) or a jet fuel (e.g., ASTM D1655) may be produced using the methods of the present invention. In an embodiment, a method for producing a diesel fuel blend may comprise: providing a bio-based feedstock; contacting the bio-based feedstock with a catalyst and an solvent to form an intermediate stream comprising carbohydrates; contacting the intermediate stream with an APR catalyst to form a plurality of oxygenated intermediates, wherein a first portion of the oxygenated intermediates are recycled to form the solvent; contacting an intermediate oxygenate stream with a condensation catalyst to produce an olefin stream; contacting the olefin stream with an oligomerization catalyst to produce higher hydrocarbons, wherein the higher hydrocarbons may meet the definition of a diesel fuel or a jet fuel.

In this embodiment, the condensation reaction may be carried out at a temperature at which the thermodynamics for the proposed reaction are favorable for the formation of olefins with a carbon number ranging from $C_2$ to $C_8$. The temperature for the condensation reaction will generally be in a range from 80° C. to 275° C., and preferably from 100° C. to 250° C., and most preferably from 150° C. to 200° C. The condensation reaction can be conducted at pressures in a range between 0 Kpa to 9000 KPa, and preferably in a range between 0 KPa and 7000 KPa, and even more preferably between 0 KPa and 5000 KPa. The olefin products produced will generally comprise one or more unsaturated bonds.

The olefin products produced from the condensation reaction may be further processed to form a fuel blend meeting the standard for a diesel fuel or a jet fuel. In an embodiment, the olefin products may be contacted with an oligomerization catalyst to produce a fuel blend. The products of an oligomerization reaction of olefins may include primarily olefins from straight oligomerization or mixtures of olefins, paraffins, cycloalkanes and aromatics. The product spectrum is influenced by both reaction conditions and the nature of the catalyst. The oligomerization of olefins over an acidic catalyst (e.g., a zeolite) is influenced by many factors including thermodynamics, kinetic and diffusional limitations, and shape-selectivity and side reactions.

Without intending to be limited by theory, it is believed that a number of reaction mechanisms are responsible for the ultimate product distribution of the reaction of olefins to form a fuel blend. For example, it is believed that the acid-catalyzed oligomerization of the olefins occurs via a carbocationic mechanism resulting in a sequential chain growth. Molecular weight growth occurs by condensation of any two olefins to a single higher olefin. Olefins also undergo double bond and skeletal isomerization. In addition to oligomerization, any two olefins may react to disproportionate to two olefins of two different carbon numbers, yielding intermediate or "nonoligomer" olefins. This may tend to randomize the molecular weight distribution of the product without significantly changing its average carbon number. Olefin cracking may also occur simultaneously with oligomerization and disproportionation. Olefins may undergo cyclization and hydrogen transfer reactions leading to the formation of cycloolefins, alkyl aromatics and paraffins, in what has been termed conjunct polymerization.

In practice, the kinetics of the oligomerization, disproportionation, and cracking reactions can determine the olefin product distribution under process conditions. At high temperature or low pressure, thermodynamics drive the reaction products to be distributed in the light olefin range whereas low temperature and high pressure tends to favor higher molecular weight olefins. At low temperature, mostly pure oligomers are formed with the majority of the product being trimer and tetramer. With increasing temperature, more disproportionation and cracking and, hence, randomization of the olefin distribution may occur. At moderate temperatures, the product may essentially be random and average carbon number can be maximized. In addition to the other thermodynamic considerations, the reactivity of olefins decreases with increasing carbon number due to the diffusional limitations within the pore system of the catalyst and the lower probability of coincident reaction centers of the molecules colliding for a bimolecular reaction.

In some embodiments, the olefinic feed stream may be pretreated to remove any oxygenates or oxygen atoms that may be present in the intermediate olefin stream. The removal of oxygenates from the olefinic stream may take place by various methods known in the art, for example, hydrotreating to remove any excess oxygen, sulfur, or nitrogen.

The oligomerization catalyst with which the olefinic feed stream is contacted may be an acid catalyst including, but not limited to, a zeolite including a shape selective or pentasil ZSM-5 zeolite types. A specific zeolite may have a shape selectivity that can be used to form a higher hydrocarbon that does not contain excessively branched hydrocarbons. For example, the acid catalyst may comprise a pentacil zeolite with a $SiO_2/Al_2O_3$ ratio ranging from about 30 to about 1000 in hydrogen or sodium form. Other zeolites with medium pores (e.g., ZSM-12, -23) may also produce oligomers with a low branching degree due to the "shape selectivity" phenomenon. Other acid catalysts may include, but are not limited to, amorphous acid materials (silico-aluminas), large pore zeolites, resins with cationic exchange, and supported acids (e.g., phosphoric acid).

In an embodiment, an olefinic oligomerization reaction may be carried out in any suitable reactor configuration. Suitable configurations include, but are not limited to, batch reactors, semi-batch reactors, or continuous reactor designs such as fluidized bed reactors with external regeneration vessels. Reactor designs may include, but are not limited to tubular reactors, fixed bed reactors, or any other reactor type suitable for carrying out the oligomerization reaction. In an embodiment, a continuous oligomerization process for the production of diesel and jet fuel boiling range hydrocarbons may be carried out using an oligomerization reactor for contacting an olefinic feed stream comprising short chain olefins having a chain length of from 2 to 8 carbon atoms with a zeolite catalyst under elevated temperature and pressure so as to convert the short chain olefins to fuel blend in the diesel boiling range. The oligomerization reactor may be operated at relatively high pressures of about 20 to 100 bar, and at a temperature of between 150° C. and 300° C., preferably about 200° C. to about 250° C., with a zeolitic oligomerization catalyst.

The reactor design may also comprise a catalyst regenerator for receiving deactivated or spent catalyst from the oligomerization reactor. The catalyst regenerator for the regeneration of the catalyst may operate at relatively low pressures of 1 to 5 bar, typically 1 to 2 bar and at temperatures of about 500° C. to 1000° C., typically 500° C. to 550° C., to burn off the coke or hydrocarbons fouling the catalyst. Air or oxygen may be introduced to the catalyst regenerator to allow any coke, carbon, or other deposits on the deactivated catalyst to be oxidized, thus regenerating the catalyst for further use in the reaction process.

In an embodiment, the regeneration reactor receives the deactivated catalyst from the oligomerization reactor. The deactivated catalyst may be removed using known means for removing a catalyst from a reactor vessel. In an embodiment, the deactivated catalyst may be removed from the oligomerization reactor using a pressure reduction system for taking the catalyst from the relatively high operating pressure of the oligomerization reactor down to the relatively low operating pressure of the catalyst regenerator. The pressure reduction system may include a lock hopper and a disengagement hopper, as known to one of ordinary skill in the art for isolating the high pressure of the reactor from the low pressure of the catalyst regenerator.

Once the catalyst has been regenerated, the regenerated catalyst may be transferred to the oligomerization reactor using known means for transporting a catalyst to a reactor vessel. In an embodiment, the regenerated catalyst may be transported to the inlet of the oligomerization reactor using a pressurizing system to increase the pressure of the regenerated catalyst prior introducing the regenerated catalyst into the oligomerization reactor. The pressurizing system may include a regenerated catalyst flow control system which is configured for safe operation thereof, a lock hopper, and pressure increasing means, for example, a venturi compressor, a mechanical compressor, or the like, to introduce the pressurized regenerated catalyst stream into the oligomerization reactor.

The resulting oligomerization stream results in a fuel blend that may have a wide variety of products including products comprising $C_5$ to $C_{24}$ hydrocarbons. Additional processing may be used to obtain a fuel blend meeting a desired standard. An initial separation step may be used to generate a fuel blend with a narrower range of carbon numbers. In an embodiment, a separation process such as a distillation process is used to generate a fuel blend comprising $C_{12}$ to $C_{24}$ hydrocarbons for further processing. The remaining hydrocarbons may be used to produce a fuel blend for gasoline, recycled to the oligomerization reactor, or used in additional processes. For example, a kerosene fraction may be derived along with the diesel fraction and can either be used as an illuminating paraffin, as a jet fuel blending component in conventional crude or synthetic derived jet fuels, or as reactant (especially $C_{10}$-$C_{13}$ fraction) in the process to produce LAB (Linear Alkyl Benzene). The naphtha fraction after hydroprocessing can be routed to a thermal cracker for the production of ethylene and propylene or routed to as is to a catalytic cracker to produce ethylene, propylene, and gasoline.

Additional processes may be used to treat the fuel blend to remove certain components or further conform the fuel blend to a diesel or jet fuel standard. Suitable techniques may include hydrotreating to remove any remaining oxygen, sulfur, or nitrogen in the fuel blend. Hydrogenation may be carried out after the hydrotreating process to saturate at least some olefinic bonds. Such hydrogenation may be performed to conform the fuel blend to a specific fuel standard (e.g., a diesel fuel standard or a jet fuel standard). The hydrogenation step of the fuel blend stream can be carried out according to the known procedures, either with the continuous or batch method. In particular, it can be effected by feeding hydrogen at a pressure ranging from 5 bar to 20 bar and at a temperature ranging from 50° C. to 150° C. and reacting for a time varying from 2 to 20 hours in the presence of a hydrogenation catalyst such as a supported palladium or platinum, for example 5% by weight of palladium or platinum on activated carbon.

Isomerization may be used to treat the fuel blend to introduced a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 20 bar to 150 bar, preferably in the range of 20 bar to 100 bar, the temperature being between 200° C. and 500° C., preferably between 300° C. and 400° C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Thus, in one embodiment, the fuel blend produced by the processes described herein is a hydrocarbon mixture that meets the requirements for jet fuel (i.e., conforms with ASTM D1655). In another embodiment, the product of the processes described herein is a hydrocarbon mixture that comprises a fuel blend meeting the requirements for a diesel fuel (i.e., conforms with ASTM D975).

To facilitate a better understanding of the present invention, the following examples of certain aspects of some embodiments are given. In no way should the following examples be read to limit, or define, the entire scope of the invention.

EXAMPLES

Examples 1-14

Batch Hydrogenolysis and Aqueous Phase Reforming

In treating an aqueous mixture of carbohydrates, the carbohydrates can be "reformed" under appropriate conditions to produce hydrogen, as illustrated by formation of isopropanol (i.e., IPA, or 2-propanol) from sorbitol in Eq. 1 shown above. Alternately, in the presence of hydrogen, polyols and mono-oxygenates such as IPA can be formed by hydrogenolysis, where hydrogen is consumed rather produced, as shown in Eqs. 2 and 3 above.

For hydrogenolysis pathways where a source of hydrogen is available (e.g., refinery offgas, or direct H2 production via renewable or non-fossil energy), the yields of biofuels may be increased via avoidance of loss of bio-based carbon as $CO_2$. The current process provides optimized conditions to produce polyols such as propylene glycol (PG) via Eq. 2 rather than produce yield loss to $CO_2$ via "reforming" reaction in Eq. 1 for those cases where a H2 source is available or can be economically provided. This may include production of $H_2$ from solar or nuclear energy with capture and storage of $CO_2$ at a centralized location, and use of that hydrogen to increase the yields of biofuels via the reactions shown in Eq. 2 and Eq. 3.

To test this concept, a series of reactions were conducted in 100-ml stirred reactors with draft-tube gas-induction impellers (Parr Series 4590). The reactors were filled with 60-grams of liquid comprising 15, 30, or 50 weight percent (wt %) sorbitol in deionized-water. Sorbitol is the sugar alcohol formed from hydrogenation of glucose, or combined hydrolysis and hydrogenation of sucrose, and is representative of a bio-based feedstock intermediate which can be readily formed from sugar cane, corn starch, or from hydrolysis of biomass. The reactor was charged with one gram of a hydrogenolysis or reforming catalyst, comprising a Group VIII metal on support. A batch reaction time of 20 hours under these conditions corresponds to a weight hourly space velocity (g-feed/g-catalyst/h) of about 3, for a comparable continuous flow reactor. A 0.5-micron sintered metal filter attached to a dip tube allowed liquid samples to be taken throughout the course of reaction. For examples #1-12, the reactor was prefilled with H2 to obtain a nominal pressure of 6000 kPa after heat up to reaction conditions. For examples #13 and #14, nitrogen was added at 3000 kPa prior to start up.

Samples were analyzed by an HPLC method based on combined size and ion exclusion chromatography, to determine unreacted sorbitol, and amount of $C_3$ and smaller polyols formed: glycerol (Gly), ethylene glycol (EG), and 1,2-propylene glycol (PG). Additional GC analyses via a moderate polarity DB-5 column were conducted to assess formation of $C_6$ and lighter oxygenated intermediates (ketones, aldehydes, alcohols). A separate GC equipped with thermal conductivity and flame ionization (FID) detectors for refinery gas analysis, were used for detection of $H_2$, $CO_2$, and light alkanes $C_1$-$C_5$.

Results of hydrogenolysis experiments conducted at 210° C. to 220° C. are shown in Table 1. Comparative aqueous phase reforming (APR) experiments under $N_2$ at 245-260° C. are given in Table 2. For these tables, "polyols total wt %" is the sum of unreacted sorbitol, plus EG, PG, and glycerol. EG, PG, and Glycerol selectivity is defined as the weight percent of these species formed, divided by the weight percent of sorbitol reacted. For example 13, a 2.6% molar yield of net $N_2$ production was observed, corresponding to a final $H_2$ atmosphere of 110 kPa. A similar $H_2$ atmosphere was present at the end of the example 14 experiment (109 kPa), from reforming of sorbitol. In addition to polyols, an array of $C_1$-$C_6$ ketones, alcohols, and carboxylic acids were also detected by GCMS (mass spec) analysis of APR and hydrogenolysis products (Table 3).

As would be known to one of ordinary skill in the art, examples 13 & 14 show that at high temperature (260° C.), few polyols remain in the APR reaction mixture. As temperature is decreased from 260° C. to 245° C. under APR conditions, the selectivity to $C_2$-$C_3$ polyols (EG, PG, Glycerol) is increased, but remains at less than 10% over the supported platinum catalyst. A further reduction in temperature to 210° C. to 220° C. and use of non-noble nickel, ruthenium, and cobalt catalysts leads to increased selectivity (25-70%) to the $C_2$-$C_3$ polyol "hydrogenolysis" products (Examples 1-12). Selectivity to hydrogenolysis or polyol products is increased (Example 12) where a dilute 15% sorbitol in water solution is fed to the reactor, relative to standard reaction conditions of 50 wt % sorbitol. Without intending to be limited by theory, it is believed that this can be explained by sorbitol degradation occurring at reaction orders greater than one, such that higher concentrations lead to nonselective byproducts. The selectivity to the $C_2$-$C_3$ hydrogenolysis polyols decreased with time, as sorbitol conversion increased, which also is indicative of additional reaction of polyol intermediates. However, it was possible to obtain greater than 90% conversion of sorbitol, while maintaining at least a 25% selectivity to the $C_2$-$C_3$ hydrogenolysis polyols EG, PG, and glycerol.

TABLE 1

| | | | | | | | | | | | | |
|---|---|---|---|---|---|---|---|---|---|---|---|---|
| Batch Hydrogenolysis Experiments | | | | | | | | | | | | |
| Ex# | Catalyst | Gas | Temp [deg C.] | Final pH | Time hours | Sorbitol wt % | Glycerol wt % | EG wt % | PG wt % | polyols total wt % | HG prod/ sorbitol | EG + PG + Gly selectivity |
| 1 | Ni/SiO2-1 | H2 | 220 | 3.85 | 0.00 | 50.00 | 0.00 | 0.00 | 0.00 | 50.00 | 0.00 | N/A |
| | | | | | 1.00 | 27.48 | 9.58 | 2.32 | 3.43 | 42.81 | 0.56 | 68.1% |
| | | | | | 3.20 | 16.48 | 8.37 | 3.43 | 7.56 | 35.84 | 1.17 | 57.7% |
| | | | | | 7.40 | 3.22 | 4.45 | 3.24 | 14.98 | 25.89 | 7.04 | 48.5% |
| | | | | | 18.10 | 0.04 | 0.51 | 1.74 | 15.64 | 17.93 | 437.50 | 35.8% |

TABLE 1-continued

Batch Hydrogenolysis Experiments

| Ex# | Catalyst | Gas | Temp [deg C.] | Final pH | Time hours | Sorbitol wt % | Glycerol wt % | EG wt % | PG wt % | polyols total wt % | HG prod/ sorbitol | EG + PG + Gly selectivity |
|---|---|---|---|---|---|---|---|---|---|---|---|---|
| 2 | 5% Ru/C | H2 | 210 | 3.71 | 0.00 | 50.00 | 0.00 | 0.00 | 0.00 | 50.00 | 0.00 | N/A |
|   |   |   |   |   | 1.00 | 37.67 | 4.80 | 1.20 | 1.50 | 45.17 | 0.20 | 60.8% |
|   |   |   |   |   | 3.30 | 27.47 | 7.68 | 2.42 | 4.44 | 42.01 | 0.53 | 64.6% |
|   |   |   |   |   | 7.40 | 24.76 | 6.86 | 2.62 | 5.45 | 39.69 | 0.60 | 59.2% |
|   |   |   |   |   | 19.00 | 19.48 | 5.17 | 2.13 | 5.58 | 32.36 | 0.66 | 42.2% |
|   |   |   |   |   | 19.10 | 16.88 | 4.47 | 1.83 | 5.08 | 28.26 | 0.67 | 34.4% |
| 3 | 5% Ru/C | H2 | 220 | 3.95 | 0.00 | 50.00 | 0.00 | 0.00 | 0.00 | 50.00 | 0.00 | N/A |
|   |   |   |   |   | 1.00 | 33.42 | 5.37 | 2.01 | 3.02 | 43.82 | 0.31 | 62.7% |
|   |   |   |   |   | 2.80 | 27.29 | 5.35 | 2.68 | 4.46 | 39.77 | 0.46 | 55.0% |
|   |   |   |   |   | 5.90 | 24.42 | 4.66 | 2.62 | 4.95 | 36.66 | 0.50 | 47.8% |
|   |   |   |   |   | 19.00 | 15.65 | 3.01 | 1.81 | 5.12 | 25.59 | 0.63 | 28.9% |
| 4 | Ni/SiO2-1 | H2 | 210 | 3.78 | 0.00 | 50.00 | 0.00 | 0.00 | 0.00 | 50.00 | 0.00 | N/A |
|   |   |   |   |   | 1.05 | 33.21 | 7.65 | 1.79 | 1.28 | 43.92 | 0.32 | 63.8% |
|   |   |   |   |   | 3.08 | 19.61 | 12.19 | 3.05 | 4.57 | 39.42 | 1.01 | 65.2% |
|   |   |   |   |   | 8.22 | 8.24 | 8.91 | 3.96 | 10.64 | 31.74 | 2.85 | 56.3% |
|   |   |   |   |   | 20.10 | 0.24 | 2.61 | 3.09 | 17.10 | 23.04 | 96.00 | 45.8% |
| 5 | Raney Co 2724 | H2 | 210 | 3.8 | 0.00 | 50.00 | 0.00 | 0.00 | 0.00 | 50.00 | 0.00 | N/A |
|   |   |   |   |   | 1.00 | 40.14 | 2.01 | 0.75 | 1.26 | 44.16 | 0.10 | 40.8% |
|   |   |   |   |   | 2.90 | 34.77 | 2.99 | 1.24 | 2.49 | 41.49 | 0.19 | 44.1% |
|   |   |   |   |   | 7.50 | 27.38 | 3.27 | 1.51 | 4.02 | 36.18 | 0.32 | 38.9% |
|   |   |   |   |   | 25.00 | 19.63 | 2.75 | 1.50 | 5.25 | 29.13 | 0.48 | 31.3% |
| 6 | 5% Ru/C | H2 | 210 | 3.68 | 0.00 | 50.00 | 0.00 | 0.00 | 0.00 | 50.00 | 0.00 | N/A |
|   |   |   |   |   | 1.00 | 39.16 | 3.76 | 0.75 | 0.75 | 44.43 | 0.13 | 48.6% |
|   |   |   |   |   | 3.50 | 30.42 | 5.94 | 1.48 | 2.47 | 40.31 | 0.33 | 50.5% |
|   |   |   |   |   | 7.33 | 27.81 | 5.63 | 1.88 | 3.29 | 38.60 | 0.39 | 48.6% |
|   |   |   |   |   | 22.50 | 21.02 | 4.12 | 1.60 | 3.66 | 30.40 | 0.45 | 32.4% |
| 7 | Ni/SiO2-1 | H2 | 210 | 3.96 | 0.00 | 50.00 | 0.00 | 0.00 | 0.00 | 50.00 | 0.00 | N/A |
|   |   |   |   |   | 1.00 | 34.41 | 5.74 | 1.57 | 0.78 | 42.50 | 0.24 | 51.9% |
|   |   |   |   |   | 2.70 | 19.97 | 9.93 | 2.98 | 4.97 | 37.85 | 0.90 | 59.5% |
|   |   |   |   |   | 7.70 | 11.09 | 8.03 | 3.89 | 10.36 | 33.37 | 2.01 | 57.3% |
|   |   |   |   |   | 18.70 | 0.05 | 0.75 | 2.50 | 17.99 | 21.29 | 425.00 | 42.5% |
| 8 | Ni/SiO2-1 | H2 | 210 | 4.82 | 0.00 | 50.00 | 0.00 | 0.00 | 0.00 | 50.00 | 0.00 | N/A |
|   |   |   |   |   | 0.00 | 48.04 | 0.00 | 0.00 | 0.00 | 48.04 | 0.00 | 0.0% |
|   |   |   |   |   | 2.50 | 23.69 | 7.48 | 2.99 | 5.49 | 39.66 | 0.67 | 60.7% |
|   |   |   |   |   | 7.70 | 12.50 | 6.71 | 3.73 | 9.94 | 32.88 | 1.63 | 54.4% |
|   |   |   |   |   | 22.80 | 2.14 | 3.24 | 3.49 | 15.95 | 24.82 | 10.58 | 47.4% |
| 9 | Ni5249P | H2 | 220 | 5.31 | 0.00 | 50.00 | 0.00 | 0.00 | 0.00 | 50.00 | 0.00 | N/A |
|   |   |   |   |   | 2.05 | 33.11 | 1.18 | 2.16 | 5.51 | 41.97 | 0.27 | 52.4% |
|   |   |   |   |   | 7.10 | 16.85 | 1.39 | 3.98 | 10.93 | 33.15 | 0.97 | 49.2% |
|   |   |   |   |   | 23.60 | 0.79 | 0.58 | 3.84 | 17.29 | 22.50 | 27.56 | 44.1% |
| 10 | 5% Ru/C | H2 | 210 | 4.1 | 0.00 | 50.00 | 0.00 | 0.00 | 0.00 | 50.00 | 0.00 | N/A |
|   |   |   |   |   | 1.25 | 37.17 | 1.00 | 1.39 | 2.99 | 42.55 | 0.14 | 41.9% |
|   |   |   |   |   | 5.92 | 28.60 | 2.39 | 2.59 | 6.98 | 40.56 | 0.42 | 55.9% |
|   |   |   |   |   | 19.60 | 17.09 | 2.71 | 3.70 | 11.54 | 35.04 | 1.05 | 54.5% |
| 11 | Ni/SiO2-1 | H2 | 210 | 7.56 | 0.00 | 50.00 | 0.00 | 0.00 | 0.00 | 50.00 | 0.00 | N/A |
|   |   |   |   |   | 2.00 | 30.13 | 0.92 | 1.93 | 4.58 | 37.56 | 0.25 | 37.4% |
|   |   |   |   |   | 6.75 | 13.21 | 0.61 | 3.65 | 9.52 | 26.99 | 1.04 | 37.4% |
|   |   |   |   |   | 25.00 | 0.72 | 0.00 | 2.94 | 12.26 | 15.92 | 21.13 | 30.8% |
| 12 | Ni/SiO2-2 | H2 | 215 | N/A | 0 | 15.00 | 0.00 | 0.00 | 0.00 | 15.00 | 0.00 | N/A |
|   |   |   |   |   | 1.5 | 4.00 | 1.37 | 1.25 | 4.60 | 11.22 | 1.81 | 65.6% |
|   |   |   |   |   | 3 | 1.09 | 1.82 | 2.09 | 5.27 | 10.27 | 8.42 | 66.0% |
|   |   |   |   |   | 5.5 | 0.11 | 2.15 | 3.04 | 4.79 | 10.09 | 90.73 | 67.0% |

Ni/SiO$_2$-1 = 64% Nickel;
Ni/SiO$_2$-2 = 53-58 wt % Ni.

TABLE 2

Batch APR Experiments

| Ex# | Catalyst | Gas | Temp [deg C.] | Final pH | Time hours | Sorbitol wt % | Glycerol wt % | EG wt % | PG wt % | polyols total wt % | HG prod/ sorbitol | EG + PG + Gly selectivity |
|---|---|---|---|---|---|---|---|---|---|---|---|---|
| 13 | 19% Pt/Al2O3 | N2 | 260 | 3.6 | 0.00 | 30.00 | 0.00 | 0.00 | 0.00 | 30.00 | 0.00 | N/A |
|   |   |   |   |   | 1.00 | 27.23 | 0.00 | 0.00 | 0.00 | 27.23 | 0.00 | 0.0% |
|   |   |   |   |   | 3.00 | 10.84 | 0.00 | 0.00 | 0.20 | 11.04 | 0.02 | 1.1% |
|   |   |   |   |   | 5.50 | 1.57 | 0.00 | 0.10 | 0.20 | 1.87 | 0.19 | 1.1% |
| 14 | 19% Pt/Al2O3 | N2 | 245 | N/A | 0.00 | 15.00 | 0.00 | 0.00 | 0.00 | 15.00 | 0.00 | N/A |
|   |   |   |   |   | 20 | 0.67 | 1.04 | 0.00 | 0.23 | 1.94 | 1.89 | 8.9% |

1.9% Pt/Al2O3 catalyst modified 2:1 Re/Pt

TABLE 3

Components formed in APR and Hydrogenolysis

Propionaldehyde
Acetone
2,5-Dimethyltetrahydrofuran
Tetrahydrofuran + Vinyl formate
2-Methyltetrahydrofuran
Methanol
Isopropyl acetate + 2-Butanone
Tetrahydropyran
Isopropyl Alcohol
Ethanol
2-Pentanone & 3-Pentanone
2-Butanol
n-Propanol
3-Hexanone
2-Hexanone
2-Methylcyclopentanone
3-Hexanol
3-Methylcyclopentanone
2-Hexanol
1-Pentanol
Dihydro-2-methyl-3(2H)-Furanone
3-Hydroxy-2-butanone
2-Methyl-1-pentanol
Ethyl lactate
1-Hexanol
1-Hydroxy-2-butanone
Acetic acid
2,5-Hexanedione
Propionic acid
2,3-Butanediol + Isobutyric Acid
Propylene glycol
Ethylene glycol
Butyric acid
Valeric acid
Hexanoic acid
Glycerol
Isosorbide
2,5-Dimethyltetrahydrofuran
2,3-Butanediol + Isobutyric Acid

Examples 15-24

Acid Condensation of Hydrogenolysis and APR Products in a Catalytic Pulse Microreactor A GC injector was loaded with 0.05 grams of ZSM-5 acid condensation catalyst, and held at 375° C. One-microliter of a carbohydrate/water mixture was injected into the catalyst bed, to examine formation of liquid fuel products. The catalytic injector insert was followed by Restek Rtx-1701 and DB-5 capillary GC columns in series, to resolve hydrocarbon and aromatic reaction components via temperature-programmed analysis.

Mixtures of pure components EG, PG, glycerol, sorbitol, and IPA were prepared, to examine plausible yields of liquid biofuels via condensation over ZSM-5. Unconverted mass corresponded largely to coke deposition (requiring burn-off via periodic regeneration), or loss to light gases.

The extent of product formation for fixed sample injection volume was measured via integration of area under the GC FID response, and dividing by the effective weight fraction of sorbitol required to prepare the mixture. For sorbitol, this was the weight fraction of sorbitol itself. For isopropanol (IPA), the stoichiometry of APR reaction (1) was assumed, while PG was assumed formed via hydrogenolysis via equation (2). In this manner, a relative yield of gasoline per unit amount of sorbitol fed to an initial APR or hydrogenolysis step, could be assessed for model compounds, as reported for Examples 15-20 in Table 4. Yields reported are the sum of all components; component yields for select cases are reported in Table 5, showing breakdowns for alkanes, olefins, benzene, toluene, xylenes, and other aromatics.

As would be evident to one of ordinary skill in the art, the results for examples #15 and #16 indicate that aqueous phase reforming to yield isopropanol (IPA) via reaction #1 results in a more than two-fold increase in yield, relative to pulsing sorbitol precursor itself, despite the loss of 50% of the carbon as $CO_2$. This was true regardless of whether the IPA was pulsed as a 16.5 wt % solution, or a 50 wt % solution, in deionized water. Hydrogenolysis to form glycerol (example #18) gave a lesser yield (two-fold better than sorbitol), but hydrogenolysis to form EG or PG (examples #19 and #20) gave higher yields than the corresponding APR reaction to form IPA, for the model compound studies.

Pulses of actual reactor product from batch APR or hydrogenolysis "stage 1" experiments were injected for examples #21-23 of Table 4. Yield from pulsing the batch reaction product from APR example #13 gave a 2.74 yield excess above sorbitol baseline, for example #21. Pulsing hydrogenolysis product form examples #10 and #8 gave even higher yields, however, for examples #22 and #23. These results demonstrate the potential for high yields via hydrogenolysis followed by acid condensation, relative to APR followed by acid condensation.

The conclusions were substantiated via analysis of yield loss to $CO_2$ and light alkanes, which were only 2.7% of total carbon for Example #10, but approached 10% of total carbon for APR examples #13 and #14.

TABLE 4

Gasoline formation via acid catalyzed condensation of APR or Hydrogenolysis Product: ZSM-5 pulse microreactor 370° C.

| Ex# | Type | Injected mix | GC area: Gasoline yield/ g-sorbitol |
|---|---|---|---|
| 15 | model feed | 50% sorbitol | 1.00 |
| 16 | model feed | 50% IPA | 2.95 |
| 17 | model feed | 16.5% IPA | 2.47 |
| 18 | model feed | 50% Glycerol | 2.03 |
| 19 | model feed | 50% EG | 4.15 |
| 20 | model feed | 50% PG | 5.47 |
| 21 | Stage 1 prod | APR Ex. #13 | 2.74 |
| 22 | Stage 1 prod | HG Ex #10 | 2.79 |
| 23 | Stage 1 prod | HG Ex #8 | 3.15 |
| 24 | Stage 1 prod | Direct HG biomass | 2.04 |

TABLE 5

Acid Condensation Product Composition (370° C. ZSM-5)

| Component | APR Ex #13 wt % | HG Ex #8 wt % | Direct HG Biomass Ex #24 wt % |
|---|---|---|---|
| alkanes | 20.24 | 24.4 | 56.85 |
| olefins | 4.08 | 4.12 | 2.19 |
| benzene | 10.11 | 6.59 | 13.54 |
| toluene | 21.36 | 25.88 | 14.97 |
| ethylbenzene | 0.41 | 0.19 | 0.22 |
| xylenes | 13.3 | 18.79 | 3.33 |
| trimethylbenzenes | 6.28 | 4.57 | 1.71 |
| Naphthalenes | 16.02 | 14.66 | 4.73 |
| others | 8.2 | 0.8 | 2.46 |
| Total knowns | 91.8 | 99.2 | 97.54 |

Example 24

Direct Hydrogenolysis of Biomass

For example #24, 3.59 grams of sugar cane bagasse solids (5% moisture) were added directly to the hydrogenolysis reactor with 60.1 grams of deionized water, to demonstrate concerted hydrolysis of biomass with hydrogenolysis of the resulting hydrolysate. 0.924 grams of Ni/SiO2-1 catalyst were used, for reaction conducted with 5300 kPa of $H_2$. Temperatures were staged for 2.5 hours at 170 C, 2.5 hours at 190 C, and 22 hours at 210 C, to allow the more readily hydrolysable $C_5$ sugars to be extracted and hydrotreated at a lower temperature, to avoid degradation to heavy ends. Results were reported as Example #24 in Table 4, and for the composition data of Table #5. Yields were two fold greater than direct feed of sorbitol to acid condensation, despite the fact that a substantial portion (up to 30%) of bagasse is lignin, which is not expected to be converted under the conditions tested.

The results show an ability to convert biomass to liquid biofuels (e.g., gasoline) by direct hydrogenolysis, followed by acid condensation.

Therefore, the invention is well adapted to attain the ends and advantages mentioned as well as those that are inherent therein. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    contacting a solid biomass feedstock comprising lignin with hydrogen and a hydrogenolysis catalyst in a reactor vessel to produce a reaction product comprising one or more polyols in an amount of greater than 25% by mole;
        wherein at least a portion of the solid biomass feedstock is converted to a carbohydrate in a hydrolysis reaction and the carbohydrate is converted to the reaction product in a hydrogenolysis reaction;
        wherein the hydrolysis reaction and the hydrogenolysis reaction are conducted in a single step; and
    contacting at least a portion of the reaction product comprising one or more polyols in an amount of greater than 25% by mole with a condensation catalyst to form one or more higher hydrocarbons comprising at least one of the following: an alkane with 4 to 30 carbon atoms, an alkene with 4 to 30 carbon atoms, a cycloalkane with 5 to 30 carbon atoms, a cycloalkene with 5 to 30 carbon atoms, an aryl, an alcohol with at least 4 carbon atoms, and a ketone with at least 4 carbon atoms.

2. The method of claim 1 wherein the biomass feedstock comprising lignin is reacted directly with a hydrogen in the presence of a hydrogenation catalyst prior to hydrogenolysis.

3. The method of claim 2 wherein the hydrogenolysis catalyst and hydrogenation catalyst are the same catalyst.

4. The method of claim 2 wherein the hydrogenolysis catalyst and the hydrogenation catalyst are present in the same reactor vessel.

5. The method of claim 1 further comprising forming a fuel blend using at least a portion of the one or more higher hydrocarbons wherein the fuel blend comprises at least one composition selected from the group consisting of: a fuel additive, a gasoline fuel, a diesel fuel, and a jet fuel.

6. The method of claim 5 wherein the fuel blend comprises at least one additive selected from the group consisting of: a saturated alcohol, a saturated polyol, and a saturated hydrocarbon.

7. The method of claim 5 wherein the fuel blend comprises a diesel fuel.

8. The method of claim 5 wherein the fuel blend comprises a jet fuel.

9. The method of claim 5 wherein the fuel blend comprises a gasoline fuel.

10. The method of claim 1 further comprising processing of at least a portion of the reaction product, wherein said processing comprises contacting at least a portion of the reaction product with a hydrogenation catalyst.

11. The method of claim 1 further comprising processing of at least a portion of the reaction product, wherein said processing comprises contacting at least a portion of the reaction product with an acid catalyst to form at least some olefins; and contacting the olefins with an oligomerization catalyst.

12. The method of claim 1 wherein the hydrogenolysis catalyst comprises at least one metal selected from the group consisting of: Cr, Mo, W, Re, Mn, Cu, Cd, Fe, Co, Ni, Pt, Pd, Rh, Ru, Ir, Os, an alloy thereof, and any combination thereof.

13. The method of claim 1 further comprising recycling the one or more polyols through the hydrogenolysis reaction.

14. A method comprising:
    contacting a bio-based feedstock comprising lignin with hydrogen and a hydrogenolysis catalyst in a reactor vessel;
    hydrolyzing at least a portion of the bio-based feedstock comprising lignin in a hydrolysis reaction to form a carbohydrate in said reactor vessel;
    reacting the carbohydrate with the hydrogen and the hydrogenolysis catalyst in a hydrogenolysis reaction in said reactor vessel to produce a reaction product comprising one or more polyols in an amount of greater than 25% by mole,
wherein the one or more polyols comprise a higher polyol, and
wherein the hydrolysis reaction and the hydrogenolysis reaction are conducted in a single step;
providing at least some of the reaction product as a product stream, wherein the product stream comprises a first portion and a second portion;
recycling at least some of the higher polyol in the first portion of the product stream to the reactor vessel; and
contacting at least some of the second portion of the product stream with a condensation catalyst to form one or more higher hydrocarbons comprising at least one of the following: an alkane with 4 to 30 carbon atoms, an alkene with 4 to 30 carbon atoms, a cycloalkane with 5 to 30 carbon atoms, a cycloalkene with 5 to 30 carbon atoms, an aryl, an alcohol with at least 4 carbon atoms, and a ketone with at least 4 carbon atoms.

15. The method of claim 14 wherein the hydrolyzing at least a portion of the bio-based feedstock comprises contacting at least a portion of the bio-based feedstock with a hydrolysis catalyst.

16. The method of claim 15 wherein the hydrolysis catalyst comprises at least one of: an acid catalyst, a base catalyst, a metal catalyst, and any combination thereof.

17. The method of claim 16 wherein the acid catalyst comprises an organic acid.

18. The method of claim 17 wherein the organic acid comprises at least one of an acetic acid, a formic acid, and a levulinic acid.

19. The method of claim 14 wherein the carbohydrate is reacted directly with a hydrogen in the presence of a hydrogenation catalyst prior to hydrogenolysis.

20. The method of claim 19 wherein the hydrogenation and hydrogenolysis catalysts are the same catalyst.

21. The method of claim 19 wherein the hydrogenolysis catalyst and the hydrogenation catalyst are present in the same reactor vessel.

22. The method of claim 14 further comprising forming a fuel blend using at least a portion of the one or more higher hydrocarbons wherein the fuel blend comprises at least one composition selected from the group consisting of: a fuel additive, a gasoline fuel, a diesel fuel, and a jet fuel.

23. The method of claim 22 wherein the fuel blend comprises at least one additive selected from the group consisting of: a saturated alcohol, a saturated polyol, and a saturated hydrocarbon.

24. The method of claim 14, further comprising processing of at least a portion of the reaction products, said processing comprises contacting at least a portion of the reaction products with a hydrogenation catalyst.

25. The method of claim 14 further comprising processing of at least a portion of the reaction products, said processing comprises contacting at least a portion of the reaction product with an acid catalyst to form at least some olefins; and contacting the olefins with an oligomerization catalyst.

26. The method of claim 14 wherein the bio-based feedstock comprising lignin further comprises a solid feedstock.

27. A method comprising:
converting a solid biomass feedstock comprising lignin to a carbohydrate in a hydrolysis reaction, said hydrolysis reaction taking place in a reaction vessel;
converting the carbohydrate to a polyol in a hydrogenolysis reaction with hydrogen and in the presence of a hydrogenolysis catalyst in said reaction vessel to produce a reaction product comprising one or more polyols;
wherein the hydrolysis reaction and the hydrogenolysis reaction are conducted in a single step; and
contacting at least a portion of the reaction product with a condensation catalyst to form one or more higher hydrocarbons comprising at least one of the following: an alkane with 4 to 30 carbon atoms, an alkene with 4 to 30 carbon atoms, a cycloalkane with 5 to 30 carbon atoms, a cycloalkene with 5 to 30 carbon atoms, an aryl, an alcohol with at least 4 carbon atoms, and a ketone with at least 4 carbon atoms.

28. The method of claim 27 wherein the hydrogenolysis catalyst comprises at least one metal selected from the group consisting of: Cr, Mo, W, Re, Mn, Cu, Cd, Fe, Co, Ni, Pt, Pd, Rh, Ru, Ir, Os, an alloy thereof, and any combination thereof.

29. The method of claim 27 wherein said contact with a condensation catalyst comprises contacting at least a portion of the reaction product with an acid catalyst to form at least some olefins; and contacting the olefins with an oligomerization catalyst.

30. The method of claim 27 further comprising removing at least a portion of the reaction product from said reaction vessel and providing one or more polyols back to said reaction vessel.

31. The method of claim 27 wherein said hydrolysis reaction comprises contacting at least a portion of the solid biomass feedstock with a hydrolysis catalyst.

32. The method of claim 31 wherein the hydrolysis catalyst comprises at least one of: an acid catalyst, a base catalyst, a metal catalyst, and any combination thereof.

33. The method of claim 27, wherein said contact with a condensation catalyst comprises contacting at least a portion of the reaction products with a hydrogenation catalyst to form the fuel blend, wherein the hydrogenation catalyst includes optionally supported Group VIII metals and Group VI metals.

* * * * *